US012722893B2

(12) United States Patent
Lee et al.

(10) Patent No.: US 12,722,893 B2
(45) Date of Patent: Sep. 1, 2026

(54) ROBOT SYSTEM

(71) Applicant: BEAR ROBOTICS KOREA, INC., Seoul (KR)

(72) Inventors: Haklim Lee, Seoul (KR); Jeeyoung Cheon, Seoul (KR)

(73) Assignee: BEAR ROBOTICS KOREA, INC., Seoul (KR)

( * ) Notice: Subject to any disclaimer, the term of this patent is extended or adjusted under 35 U.S.C. 154(b) by 415 days.

(21) Appl. No.: 18/210,777

(22) Filed: Jun. 16, 2023

(65) Prior Publication Data

US 2024/0351788 A1 Oct. 24, 2024

(30) Foreign Application Priority Data

Apr. 24, 2023 (KR) ........................ 10-2023-0053093

(51) Int. Cl.
*B65G 1/137* (2006.01)

(52) U.S. Cl.
CPC .................................. *B65G 1/1375* (2013.01)

(58) Field of Classification Search
CPC . B65G 1/026; B65G 1/06; B65G 1/10; B65G 1/1375; B25J 5/007; B25J 9/0084; B25J 9/0093; B25J 9/0096; B25J 15/0014
See application file for complete search history.

(56) References Cited

U.S. PATENT DOCUMENTS 5,833,427 A * 11/1998 Siegler ................. B65G 1/0435 414/277
7,128,521 B2 * 10/2006 Hansl ........................ B66F 9/07 414/807
8,790,061 B2 * 7/2014 Yamashita ........... B65G 1/0435 414/280
9,656,806 B2 5/2017 Brazeau et al.
10,322,875 B2 * 6/2019 De Vries .............. B65G 1/0435
10,894,663 B2 * 1/2021 Kapust ................. B65G 1/1373
11,745,945 B2 * 9/2023 Fjeldheim .............. B65G 1/065 414/281
2007/0140817 A1 * 6/2007 Hansl ........................ B66F 9/07 414/277

(Continued)

FOREIGN PATENT DOCUMENTS

CA 3 119 896 A1 12/2020
KR 10-1327675 B1 11/2013

(Continued)

OTHER PUBLICATIONS

Choi, "China Yogo Robot raises hundreds of millions of yuan in Series C funding", Irobotnews, Oct. 23, 2022, URL: http://www.irobotnews.com/news/articleView.html?idxno=29837.

(Continued)

*Primary Examiner* — Joseph C Rodriguez
(74) *Attorney, Agent, or Firm* — Birch, Stewart, Kolasch & Birch, LLP

(57) ABSTRACT

A robot system includes a station body, a carrier located in the station body, a first robot having a lifter configured to lift the carrier relative to the station body, the first robot being configured to move in a first direction in the station body, and a second robot configured to move in the station body in a second direction different from the first direction, the second robot having a seating body on which the first robot is seatable.

20 Claims, 23 Drawing Sheets

(56) References Cited

U.S. PATENT DOCUMENTS

2012/0099953 A1 4/2012 Hortig et al.
2012/0185080 A1* 7/2012 Cyrulik .................... B65G 1/06 700/214
2020/0277137 A1* 9/2020 Bastian ................... B66F 9/065
2022/0371825 A1 11/2022 Gravelle
2023/0011746 A1* 1/2023 Turco ................... B65G 1/0492
2023/0066277 A1 3/2023 Zhan et al.

FOREIGN PATENT DOCUMENTS

KR 10-2014-0009971 A 1/2014
KR 10-1933827 B1 12/2018
KR 10-2339212 B1 12/2021

OTHER PUBLICATIONS

ITmoda, "Robots deliver packages to your doorstep", YouTube, Aug. 21, 2021, URL: https://www.youtube.com/watch?v=nMqdvRAq2mk.
Unknown, "Robot 'courier' delivery era begins . . . Watt completes technology verification and accelerates commercialization", etnews, Aug. 22, 2021, URL: https://www.etnews.com/20210820000155.

* cited by examiner

FIG. 21

ROBOT SYSTEM

CROSS-REFERENCE TO RELATED APPLICATIONS

This application claims the benefit of priority under 35 U.S.C. 119 to Korean Patent Application No. 10-2023-0053093, filed in the Republic of Korea on Apr. 24, 2023, the entire contents of which are incorporated herein by reference.

BACKGROUND

The present invention relates to robot system.

A robot is a machine that automatically processes or operates a given task by own capabilities thereof, and the application fields of robots can be generally classified into industrial, medical, space, subsea use, and the like and can be used in various fields.

In order to deliver items using a robot, a robot that can move indoors and outdoors and a delivery box that can store items such as items may be needed, and the robot and the delivery box can communicate with each other and the robot docks with the delivery box, the delivery boxes should be able to move items to the robot. In addition, the robot should be able to transport items to its destination, such as in front of the house.

SUMMARY

Embodiments provide a robot system capable of safely and quickly transporting items stored inside the station body to the exit of the station body.

Embodiments provide a robot system capable of maximizing the size of items stored in a station body.

A robot system according to one embodiment comprises a station body on which an object is placed; a first robot having a lifter that lifts the object placed on the station body and disposed to move in a first direction on the station body; and a second robot disposed on the station body to move in a second direction different from the first direction and having a seating body on which the first robot is seated.

The station body may comprise a first guide rail having a height lower than a height of the transport object and on which the first robot is guided.

The station body may further include a second guide rail having a height lower than a height of the first guide rail and guiding the second robot.

The first guide rail may be disposed long in the front and rear direction, and the second guide rail may be disposed long in the left and right direction.

A first robot charger for charging the first robot may be disposed in the station body.

A second robot charger for charging the second robot may be disposed in the station body.

The station body may comprise an outlet.

The robot system further comprises a pusher pushing an item placed on the object; and a conveyor for transferring the item pushed by the pusher to the outlet of the station body.

The first robot further comprises a first robot body on which the lifter is disposed; an in-wheel motor disposed on the first robot body; and a proximity sensor disposed on the first robot body.

The first robot may further comprise a guide roller disposed on the first robot body and rolling along the station body or the second robot.

The first robot further may comprise a magnet installed on the bottom of the first robot body.

The second robot further may comprise a hall sensor for sensing the magnet.

The first robot further may comprise a first battery disposed in the first robot body; a charging terminal electrically connected to the first battery.

The lifter may comprise a lift plate, and the charging terminal is arranged to be lifted together with the lift plate.

The second robot may further comprise a supply terminal to which the charging terminal comes in contact.

The lifter may comprise a lift plate that lifts an object; a guide plate coupled to the lift plate; a lift bush disposed on the guide plate; and an actuator disposed on the first robot body to lift the lift bush.

A first robot accommodating space accommodating at least a portion of the first robot is formed in the seating body.

The first robot may comprise a wheel, and a wheel accommodating portion is formed in the seating body to which a portion of the wheel is inserted and caught.

The second robot may comprise a second robot body on which the seating body is disposed; a wheel arranged to rotate on the second robot body; a motor that rotates the wheel; a second battery disposed in the second robot body; and an inner proximity sensor disposed on the second body to sense the first robot.

An accommodating portion accommodating the driving portion of the lifter may be formed in the second robot body.

The second robot may further comprise an outer proximity sensor disposed on the second robot body.

A robot system according to another embodiment comprises a station body in which an outlet through which item passes is formed and a frame is disposed therein; a guide rail disposed on the frame; a robot guided along the guide rail and carrying the item; a lifting mechanism for lifting the robot guided by the guide rail; a pusher pushing item on the robot; and a conveyor for conveying the item pushed by the pusher to the outlet.

The robot may comprise a first robot moving in a first direction along the guide rail; and a second robot having a seating body on which the first robot is seated and moving along the guide rail in a second direction different from the first direction.

The robot is raised to a height of the guide rail by the lifting mechanism and moves to the guide rail in a state in which the first robot is seated on the second robot.

The first robot may comprise a lifter that lifts an item.

The first robot may lift the item in a third direction perpendicular to the first and second directions in a state in which the first robot is separated from the second robot.

The details of one or more embodiments are set forth in the accompanying drawings and the description below. Other features will be apparent from the description and drawings, and from the claims.

BRIEF DESCRIPTION OF THE DRAWINGS

FIG. 21 is a cross-sectional view when the first robot is seated on the second robot according to the present embodiment.

DETAILED DESCRIPTION OF THE EMBODIMENTS

Figure 1:
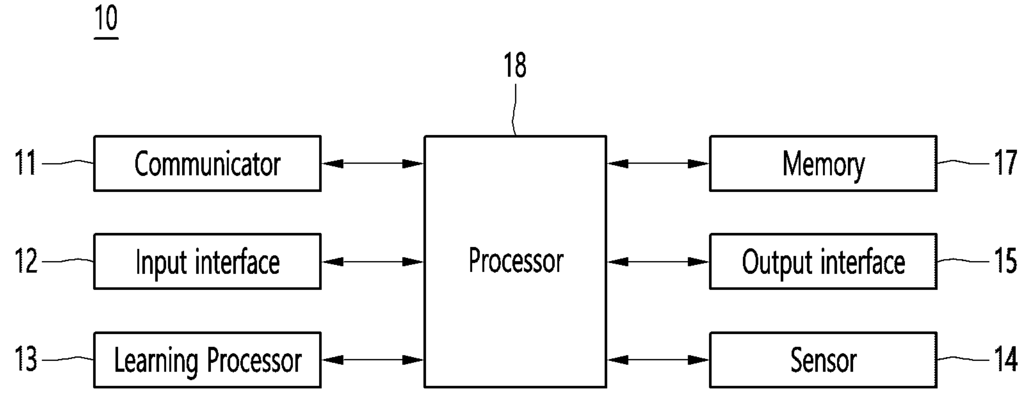
FIG. 1 illustrates an artificial intelligence (AI) device including a robot according to an embodiment of the present disclosure.

Hereinafter, detailed embodiments will be described in detail with reference to the accompanying drawings.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 10 including a robot according to an embodiment of the present disclosure.

The AI device 10 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 10 may include a communicator 11, an input interface 12, a learning processor 13, a sensor 14, an output interface 15, a memory 17, and a processor 18.

The communicator 11 may transmit and receive data to and from external devices such as other AI devices 10*a* to 10*e* and the AI server 20 by using wire/wireless communication technology. For example, the communicator 11 may transmit and receive sensor information, a user input, a learning model, and a control signal to and from external devices.

The communication technology used by the communicator 11 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee™, NFC (Near Field Communication), and the like.

The input interface 12 may acquire various kinds of data.

At this time, the input interface 12 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 12 may acquire a learning data for model learning and an input data to be used when an output is acquired by using learning model. The input interface 12 may acquire raw input data. In this case, the processor 18 or the learning processor 13 may extract an input feature by preprocessing the input data.

The learning processor 13 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 13 may perform AI processing together with the learning processor 24 of the AI server 20.

At this time, the learning processor 13 may include a memory integrated or implemented in the AI device 10. Alternatively, the learning processor 13 may be implemented by using the memory 17, an external memory directly connected to the AI device 10, or a memory held in an external device.

The sensor 14 may acquire at least one of internal information about the AI device 10, ambient environment information about the AI device 10, and user information by using various sensors.

Examples of the sensors included in the sensor 14 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 15 may generate an output related to a visual sense, an auditory sense, or a haptic sense.

At this time, the output interface 15 may include a display unit for outputting time information, a speaker for outputting auditory information, and a haptic module for outputting haptic information.

The memory 17 may store data that supports various functions of the AI device 10. For example, the memory 17 may store input data acquired by the input interface 12, learning data, a learning model, a learning history, and the like.

The processor 18 may determine at least one executable operation of the AI device 10 based on information determined or generated by using a data analysis algorithm or a machine learning algorithm. The processor 18 may control the components of the AI device 10 to execute the determined operation.

To this end, the processor 18 may request, search, receive, or utilize data of the learning processor 13 or the memory 17. The processor 18 may control the components of the AI device 10 to execute the predicted operation or the operation determined to be desirable among the at least one executable operation.

When the connection of an external device is required to perform the determined operation, the processor 18 may generate a control signal for controlling the external device and may transmit the generated control signal to the external device.

The processor 18 may acquire intention information for the user input and may determine the user's requirements based on the acquired intention information.

The processor 18 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 13, may be learned by the learning processor 24 of the AI server 20, or may be learned by their distributed processing.

The processor 18 may collect history information including the operation contents of the AI apparatus 100 or the user's feedback on the operation and may store the collected history information in the memory 17 or the learning processor 13 or transmit the collected history information to the external device such as the AI server 20. The collected history information may be used to update the learning model.

The processor 18 may control at least part of the components of AI device 10 so as to drive an application program stored in memory 17. Furthermore, the processor 18 may operate two or more of the components included in the AI device 10 in combination so as to drive the application program.

Figure 2:
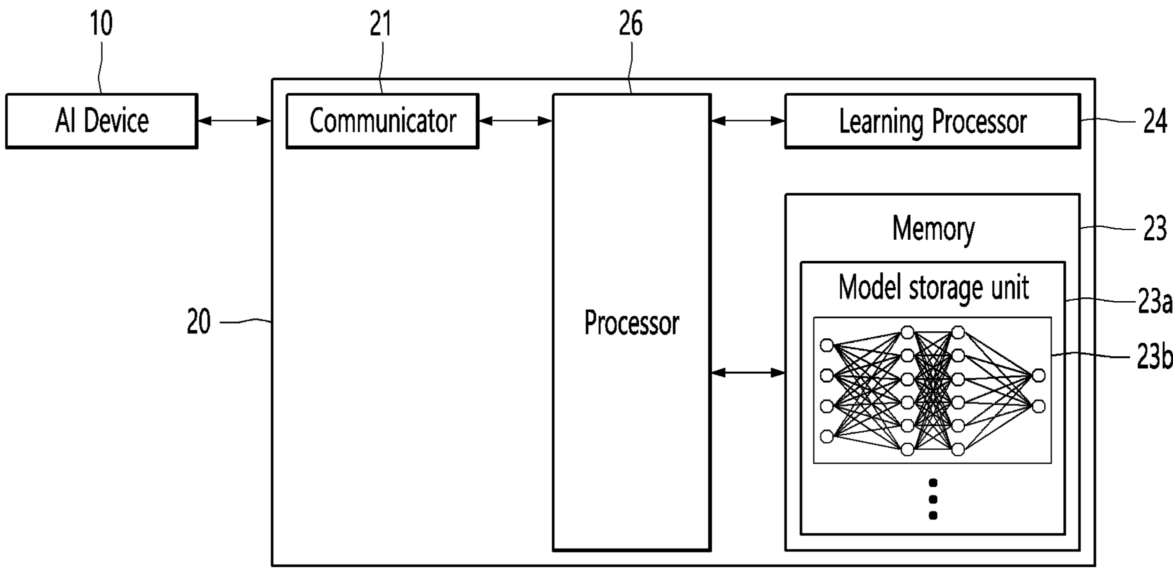
FIG. 2 illustrates an AI server connected to a robot according to an embodiment of the present disclosure.

FIG. 2 illustrates an AI server 20 connected to a robot according to an embodiment of the present disclosure.

Referring to FIG. 2, the AI server 20 may refer to a device that learns an artificial neural network by using a machine learning algorithm or uses a learned artificial neural network. The AI server 20 may include a plurality of servers to perform distributed processing, or may be defined as a 5G network. At this time, the AI server 20 may be included as a partial configuration of the AI device 10, and may perform at least part of the AI processing together.

The AI server 20 may include a communicator 21, a memory 23, a learning processor 24, a processor 26, and the like.

The communicator 21 can transmit and receive data to and from an external device such as the AI device 10.

The memory 23 may include a model storage unit 23*a*. The model storage unit 23*a* may store a learning or learned model (or an artificial neural network 26*b*) through the learning processor 24.

The learning processor 24 may learn the artificial neural network 26*b* by using the learning data. The learning model may be used in a state of being mounted on the AI server 20 of the artificial neural network, or may be used in a state of being mounted on an external device such as the AI device 10.

The learning model may be implemented in hardware, software, or a combination of hardware and software. If all or part of the learning models are implemented in software, one or more instructions that constitute the learning model may be stored in memory 23.

The processor 26 may infer the result value for new input data by using the learning model and may generate a response or a control command based on the inferred result value.

Figure 3:
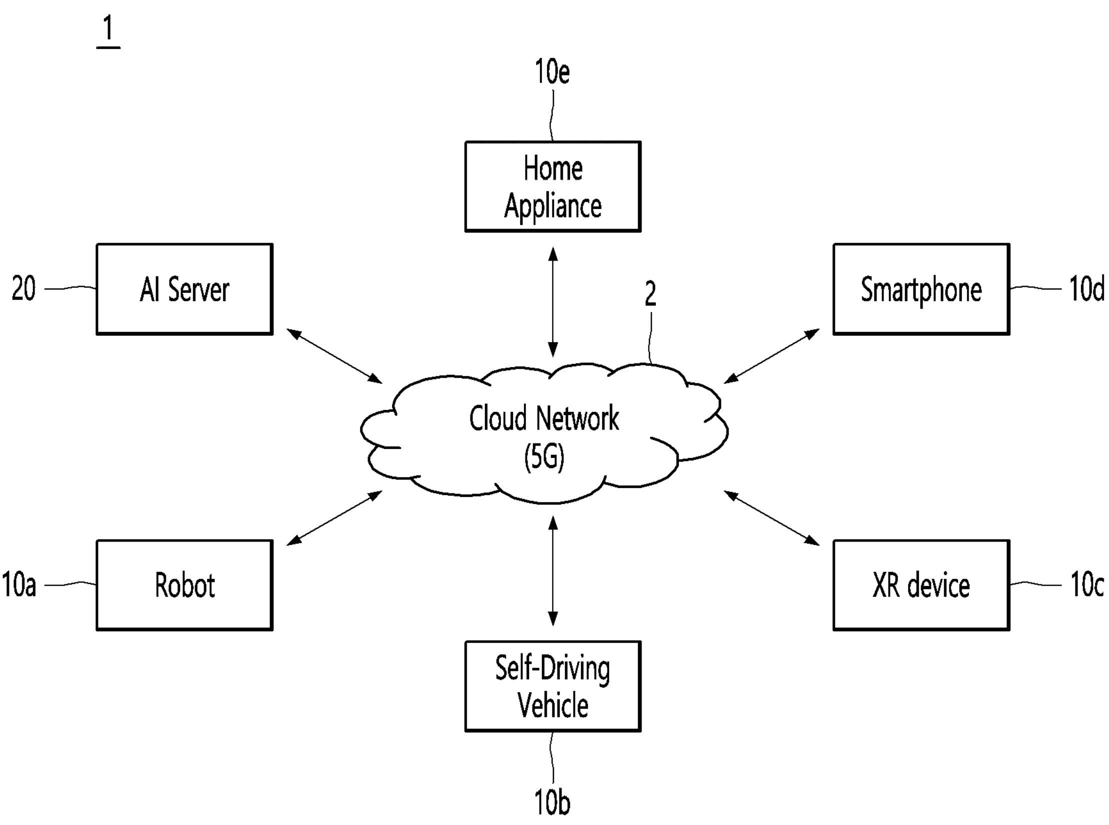
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 20, a robot 10*a*, a self-driving vehicle 10*b*, an XR device 10*c*, a smartphone 10*d*, or a home appliance 10*e* is connected to a cloud network 2. The robot 10*a*, the self-driving vehicle 10*b*, the XR device 10*c*, the smartphone 10*d*, or the home appliance 10*e*, to which the AI technology is applied, may be referred to as AI devices 10*a* to 10*e*.

The cloud network 2 may refer to a network that forms part of a cloud computing infrastructure or exists in a cloud computing infrastructure. The cloud network 2 may be configured by using a 3G network, a 4G or LTE network, or a 5G network.

That is, the devices 10*a* to 10*e* and 20 configuring the AI system 1 may be connected to each other through the cloud network 2. In particular, each of the devices 10*a* to 10*e* and 20 may communicate with each other through a base station, but may directly communicate with each other without using a base station.

The AI server 20 may include a server that performs AI processing and a server that performs operations on big data.

The AI server 20 may be connected to at least one of the AI devices constituting the AI system 1, that is, the robot 10*a*, the self-driving vehicle 10*b*, the XR device 10*c*, the smartphone 10*d*, or the home appliance 10*e* through the cloud network 2, and may assist at least part of AI processing of the connected AI devices 10*a* to 10*e*.

At this time, the AI server 20 may learn the artificial neural network according to the machine learning algorithm instead of the AI devices 10*a* to 10*e*, and may directly store the learning model or transmit the learning model to the AI devices 10*a* to 10*e*.

At this time, the AI server 20 may receive input data from the AI devices 10*a* to 10*e*, may infer the result value for the received input data by using the learning model, may generate a response or a control command based on the inferred result value, and may transmit the response or the control command to the AI devices 10*a* to 10*e*.

Alternatively, the AI devices 10*a* to 10*e* may infer the result value for the input data by directly using the learning model, and may generate the response or the control command based on the inference result.

Hereinafter, various embodiments of the AI devices 10*a* to 10*e* to which the above-described technology is applied will be described. The AI devices 10*a* to 10*e* illustrated in FIG. 3 may be regarded as a specific embodiment of the AI device 10 illustrated in FIG. 1.

<AI+Robot>

The robot 10*a*, to which the AI technology is applied, may be implemented as a guide robot, a carrying robot, a cleaning robot, a wearable robot, an entertainment robot, a pet robot, an unmanned flying robot, or the like.

The robot 10*a* may include a robot control module for controlling the operation, and the robot control module may refer to a software module or a chip implementing the software module by hardware.

The robot 10*a* may acquire state information about the robot 10*a* by using sensor information acquired from various kinds of sensors, may detect (recognize) surrounding environment and objects, may generate map data, may determine the route and the travel plan, may determine the response to user interaction, or may determine the operation.

The robot 10*a* may use the sensor information acquired from at least one sensor among the lidar, the radar, and the camera so as to determine the travel route and the travel plan.

The robot 10*a* may perform the above-described operations by using the learning model composed of at least one artificial neural network. For example, the robot 10*a* may recognize the surrounding environment and the objects by using the learning model, and may determine the operation by using the recognized surrounding information or object information. The learning model may be learned directly from the robot 10*a* or may be learned from an external device such as the AI server 20.

At this time, the robot 10*a* may perform the operation by generating the result by directly using the learning model, but the sensor information may be transmitted to the external device such as the AI server 20 and the generated result may be received to perform the operation.

The robot 10*a* may use at least one of the map data, the object information detected from the sensor information, or the object information acquired from the external apparatus to determine the travel route and the travel plan, and may control the driving unit such that the robot 10*a* travels along the determined travel route and travel plan.

The map data may include object identification information about various objects arranged in the space in which the robot 10*a* moves. For example, the map data may include object identification information about fixed objects such as walls and doors and movable objects such as pollen and desks. The object identification information may include a name, a type, a distance, and a position.

In addition, the robot 10*a* may perform the operation or travel by controlling the driving unit based on the control/interaction of the user. At this time, the robot 10*a* may acquire the intention information of the interaction due to the user's operation or speech utterance, and may determine the response based on the acquired intention information, and may perform the operation.

<AI+Robot+Self-Driving>

The robot 10*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 10*a*, to which the AI technology and the self-driving technology are applied, may refer to the robot itself having the self-driving function or the robot 10*a* interacting with the self-driving vehicle 10*b*.

The robot 10*a* having the self-driving function may collectively refer to a device that moves for itself along the given movement line without the user's control or moves for itself by determining the movement line by itself.

The robot 10*a* and the self-driving vehicle 10*b* having the self-driving function may use a common sensing method so as to determine at least one of the travel route or the travel plan. For example, the robot 10*a* and the self-driving vehicle 10*b* having the self-driving function may determine at least one of the travel route or the travel plan by using the information sensed through the lidar, the radar, and the camera.

The robot 10*a* that interacts with the self-driving vehicle 10*b* exists separately from the self-driving vehicle 10*b* and may perform operations interworking with the self-driving function of the self-driving vehicle 10*b* or interworking with the user who rides on the self-driving vehicle 10*b*.

At this time, the robot 10*a* interacting with the self-driving vehicle 10*b* may control or assist the self-driving function of the self-driving vehicle 10*b* by acquiring sensor information on behalf of the self-driving vehicle 10*b* and providing the sensor information to the self-driving vehicle 10*b*, or by acquiring sensor information, generating environment information or object information, and providing the information to the self-driving vehicle 10*b*.

Alternatively, the robot 10*a* interacting with the self-driving vehicle 10*b* may monitor the user boarding the self-driving vehicle 10*b*, or may control the function of the self-driving vehicle 10*b* through the interaction with the user. For example, when it is determined that the driver is in a drowsy state, the robot 10*a* may activate the self-driving function of the self-driving vehicle 10*b* or assist the control of the driving unit of the self-driving vehicle 10*b*. The function of the self-driving vehicle 10*b* controlled by the robot 10*a* may include not only the self-driving function but also the function provided by the navigation system or the audio system provided in the self-driving vehicle 10*b*.

Alternatively, the robot 10*a* that interacts with the self-driving vehicle 10*b* may provide information or assist the function to the self-driving vehicle 10*b* outside the self-driving vehicle 10*b*. For example, the robot 10*a* may provide traffic information including signal information and the like, such as a smart signal, to the self-driving vehicle 10*b*, and automatically connect an electric charger to a charging port by interacting with the self-driving vehicle 10*b* like an automatic electric charger of an electric vehicle.

Figure 4:
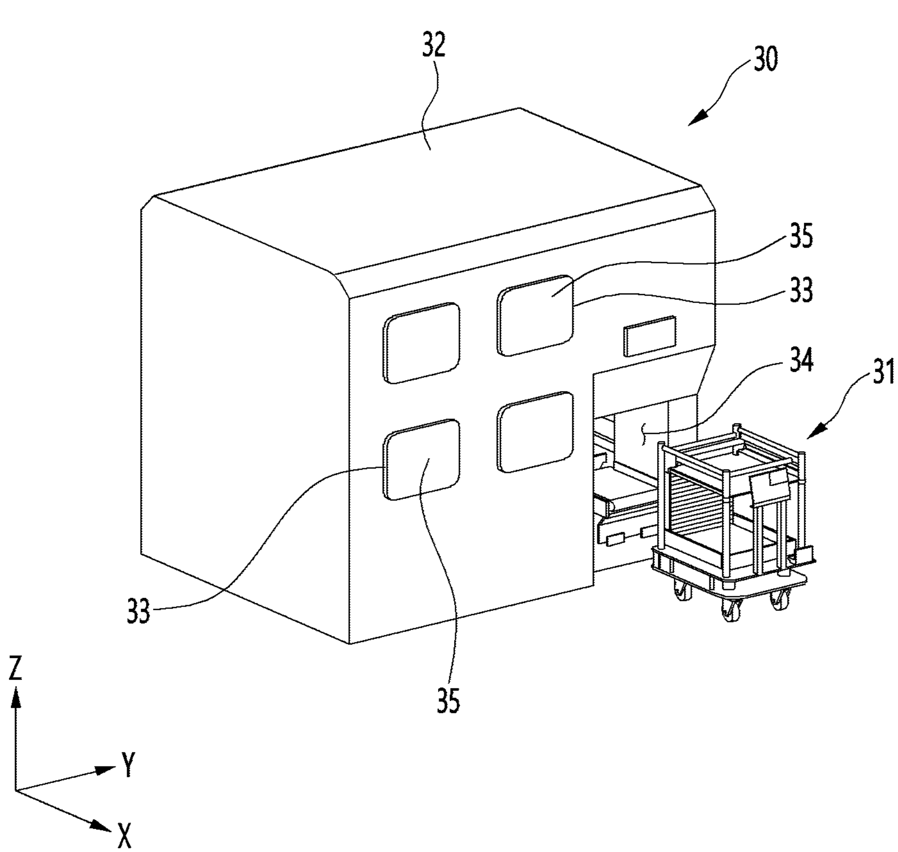
FIG. 4 is a perspective view showing a robot system according to the present embodiment.

FIG. 4 is a perspective view showing a robot system according to the present embodiment.

The robot system may comprise a station body 30 for storing items and a delivery robot 31 for delivering items in the station body 30 to a destination.

An example of an item that can be moved by the delivery robot 31 may be a delivery box.

Items can be put into the station body 30 from the outside, and the items stored in the station body 30 can be transferred to the delivery robot 31, and the delivery robot 31 can transport items to its destination.

The delivery robot 31 may be an outer robot that travels outside the station body 30. The delivery robot 31 can dock to the exit 34 of the station body 30.

The station body 30 may be a delivery station for storing items such as parcel.

The station body 30 may comprise an outer case 32 forming an exterior of the station body 30.

An example of the station body 30 may comprise an inlet 33 through which item is introduced and an outlet 34 through which items is taken out.

In another example of the station body 30, an inlet and an outlet may be formed by a single opening, and an entrance through which item may be transferred in or out may be formed in the station body 30.

A plurality of items may be stored in the station body 30. While items in the station body 30 is being taken out, new item may be put into the station body 30, and an inlet 33 and an outlet 34 are preferably formed in the station body 30, respectively.

It is preferable that the inlet 33 and the outlet 34 are spaced apart from each other.

It is preferable that the inlet 33 is formed in plurality.

The station body 30 may comprise a door 35 opening and closing the inlet 33. The door 35 may be rotated or slid to open and close the inlet 33. When there is a plurality of inlets 33, it is preferable that a plurality of doors 35 are also provided. The number of doors 35 may be equal to the number of inlets 33.

The outlet 34 is preferably formed to correspond to the height of the delivery robot 31.

A separate inner robot may be disposed inside the station body 30, and the separate inner robot is different from the delivery robot 31. The inner robot may help take out the items in the station body 30 to the outlet 34. Hereinafter, the inner robot is referred to as the robot 10*a* and will be described.

The robot 10*a* may move inside the station body 30 and may be an inner shuttle robot that transports item in the station body 30.

Figure 5:
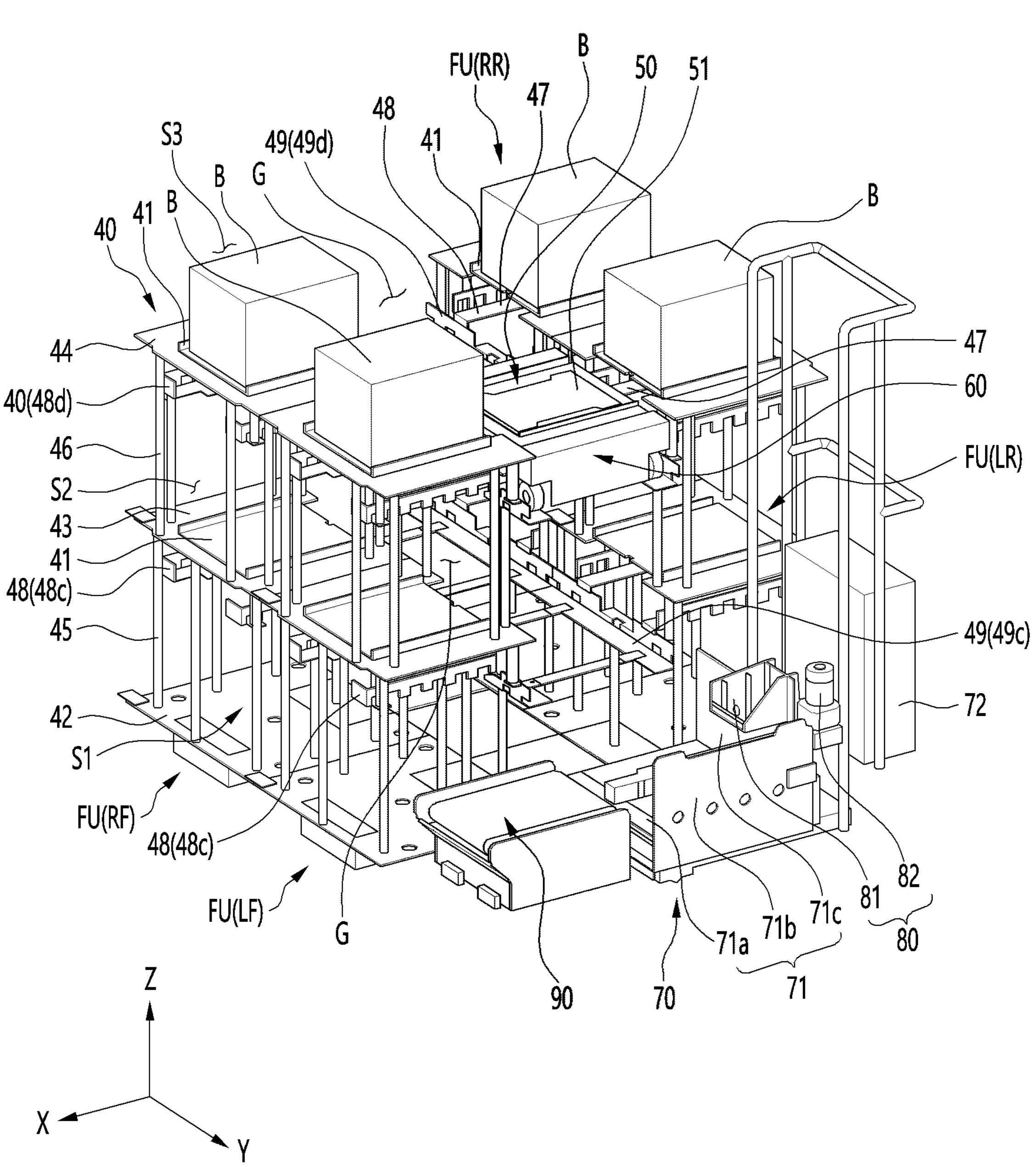
FIG. 5 is a perspective view in which the outer case shown in FIG. 4 is separated.
Figure 6:
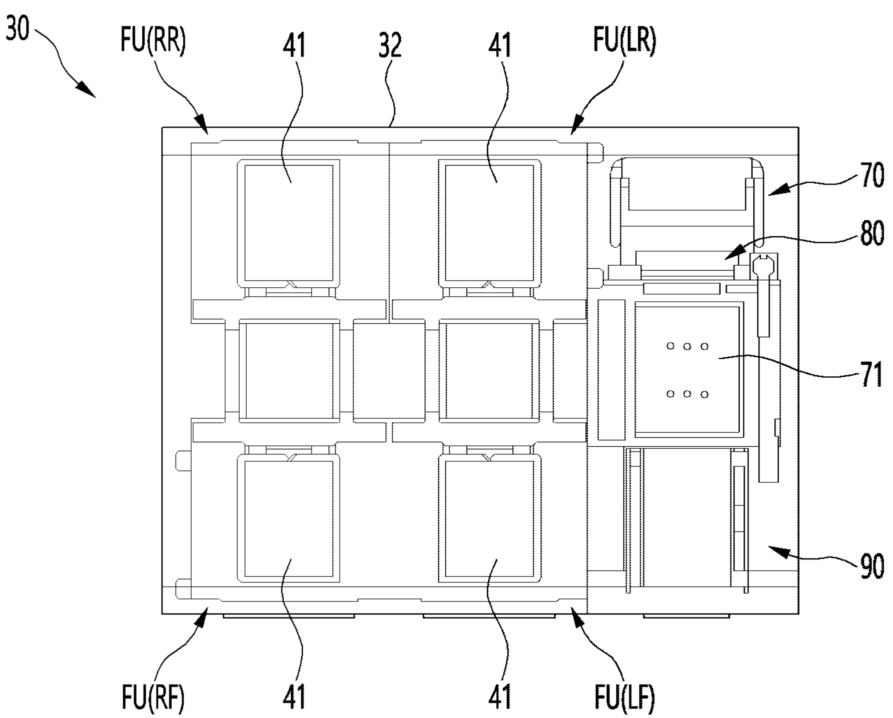
FIG. 6 is a plan view showing the inside of the robot system according to the present embodiment.
Figure 7:
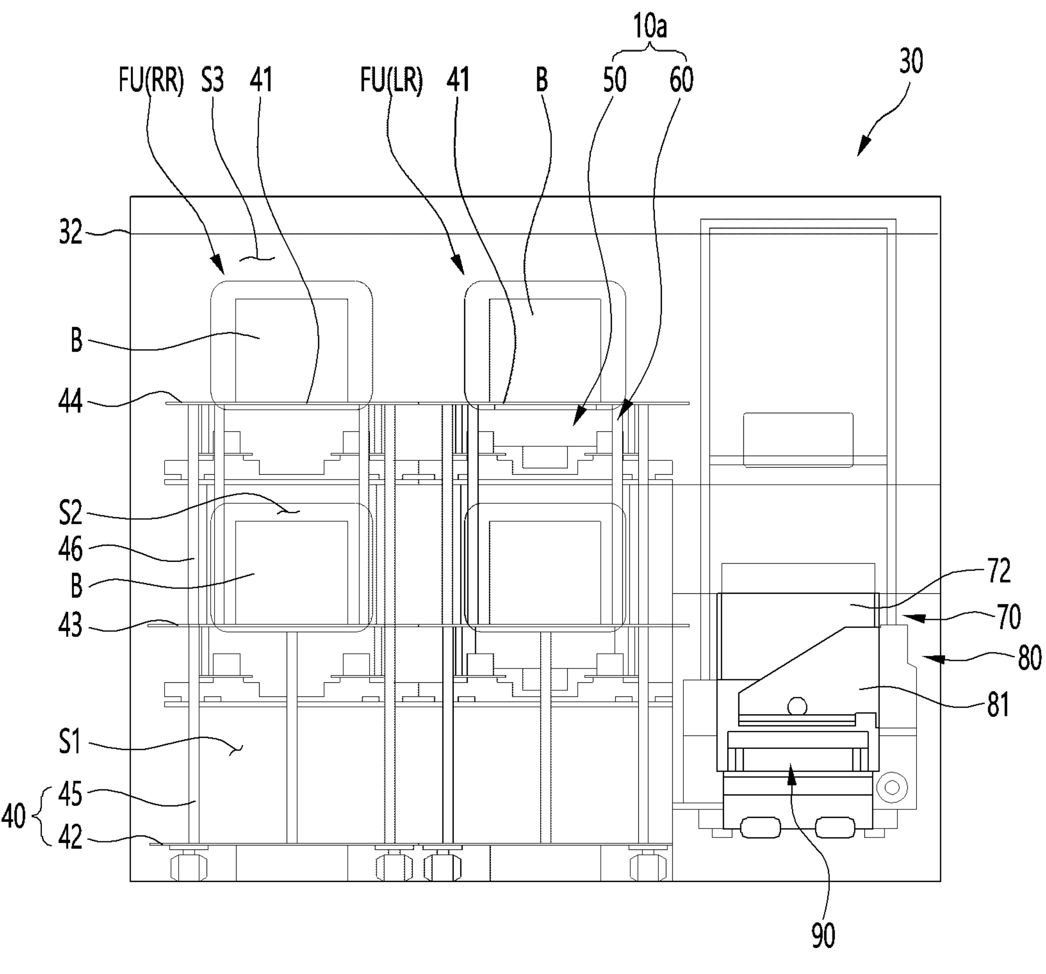
FIG. 7 is a front view showing the inside of the robot system according to the present embodiment.
Figure 8:
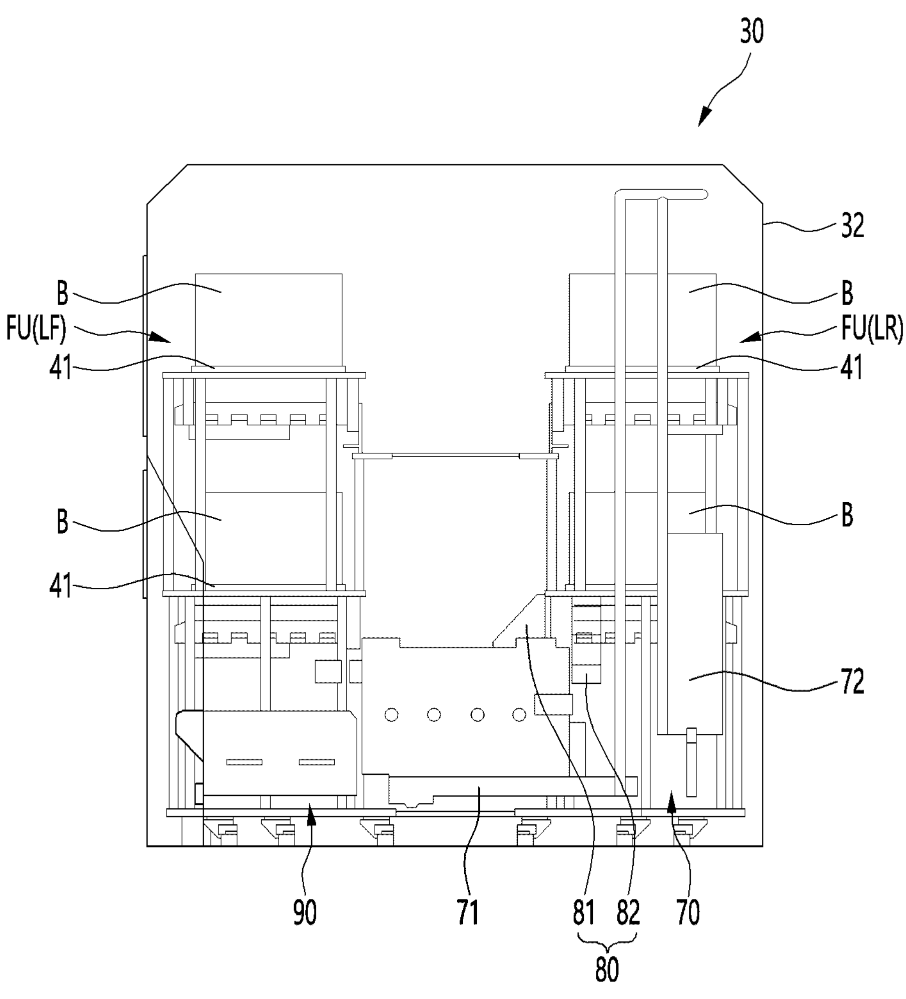
FIG. 8 is a side view showing the inside of the robot system according to the present embodiment.
Figure 9:
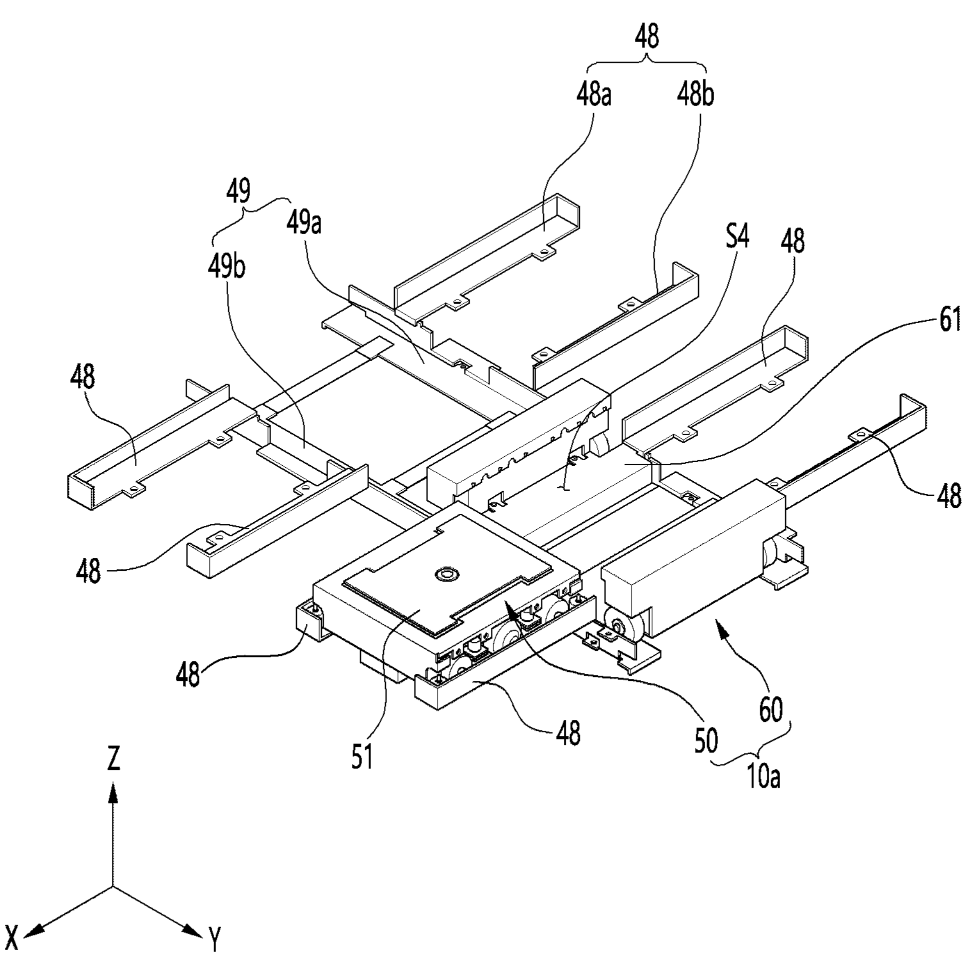
FIG. 9 is a perspective view showing a guide rail and a robot according to the present embodiment.

FIG. 5 is a perspective view in which the outer case shown in FIG. 4 is separated, FIG. 6 is a plan view showing the inside of the robot system according to the present embodiment, FIG. 7 is a front view showing the inside of the robot system according to the present embodiment, FIG. 8 is a side view showing the inside of the robot system according to the present embodiment, FIG. 9 is a perspective view showing a guide rail and a robot according to the present embodiment.

The robot system may use a system that lifts and moves an object through a guide rail.

The station body 30 may comprise a frame 40 disposed inside the outer case 32.

An object 41 may be placed on the frame 40. The object 41 may be a carrier carried by the robot 10*a*, and an item B may be placed on the object 41. An example of the item B may be a delivery box. The object 41 may be a box plate containing the delivery box.

If the type of item B is an item in an atypical state such as a bag, the robot system can transport the item B using the carrier 41 as a fixed medium, and the robot system can store and extract various types of items.

The frame 40 may be disposed inside the station body 30.

The frame 40 may be accommodated inside the outer case 32 (see FIG. 4).

Frame 40 may be a combination of a plurality of members. The frame 40 may include plates 42, 43, and 44 and posts 45 and 46.

A plurality of plates 42, 43, and 44 may be provided, and a space may be formed between the plurality of plates 42, 43, and 44. The plurality of plates 42, 43, and 44 may include a base plate 42, a middle plate 43, and an upper plate 44.

The base plate 42 may be located above the base of the outer case 32.

The middle plate 43 may be positioned above the base plate 42, and a space may be formed between the middle plate 43 and the base plate 42. A space formed between the base plate 42 and the middle plate 43 may be a base space S1.

The upper plate 44 may be positioned above the middle plate 43, and a space may be formed between the upper plate 44 and the middle plate 43, and a space formed between the middle plate 43 and the upper plate 44 may form a storage space S2 in which the item B can be accommodated and stored. The storage space S2 may be a lower space S2 having a higher height than the base space S1, and may be separated from the base space S1 by the middle plate 43.

A space formed between the upper plate 44 and the top cover of the outer case 32 can be a storage space S3 in which the item B can be accommodated and stored. This storage space S3 may be an upper space S3 higher in height than the lower space S2, and may be separated from the lower space S2 by the upper plate 44.

The object 41 may be seated on at least one of the plurality of plates 42, 43, and 44.

A plurality of objects 41 may be provided in the robot system. The object 41 may be provided on each of the middle plate 43 and the upper plate 44.

The object 41 may be seated on the middle plate 43, and the middle plate 43 may be a seating plate (e.g., a lower seating body) on which the object 41 is seated. The object 41 seated on the middle plate 43 may be a lower object.

The object 41 may be seated on the upper plate 44, and the upper plate 43 may be a seat plate (e.g., an upper seat body) on which the object 41 is seated. The object 41 seated on the upper plate 44 may be an upper object.

An opening 47 through which the lifter 51 of the robot 10*a* passes may be formed in the seating plate. The opening 47 may be opened in the vertical direction Z of the seating plate. The opening 47 may be opened in the front and rear direction X of the seating plate.

The size of the opening 47 may be larger than a size of the lifter 51 and may be smaller than that of the object 41.

The width of the object 41 in the second direction Y may be greater than the width of the opening 47 in the second direction Y, and each of both ends of the object 41 in the second direction Y can be seated around the periphery of the opening 47.

The width of the lifter 51 in the second direction Y may be smaller than the width of the opening 47 in the second direction Y, and a portion of the lifter 51 may pass through the opening 47 in the vertical direction Z.

The lifter 51 can be raised from the lower side of the opening 47 of the seating plate, pass through the opening 47, and come into contact with the lower surface of the object 41 to lift the object 41.

When the lifter 51 lifts the object 41, the object 41 can be positioned above the seating plate, can be spaced apart from the seating plate in the vertical direction Z, and a gap G may be formed between the object 41 and the seating plate.

A plurality of posts 45 and 46 may be provided.

The plurality of posts 45 and 46 may include a lower post 45 and an upper post 46.

The lower post 45 may be disposed between the base plate 42 and the middle plate 43 and may space the middle plate 43 apart from the base plate 42 in the vertical direction Z.

The upper post 46 may be disposed between the middle plate 43 and the upper plate 44, and may space the upper plate 44 apart from the middle plate 43 in the vertical direction Z.

The station body 30 may include a plurality of frame units FUs.

Each of the plurality of frame units FUs may include a plurality of plates 42, 43, and 44 and a plurality of posts 45 and 46. A plurality of frame units FUs may be accommodated together in the outer case 32.

In the station body 30, a plurality of frame units FUs may be arranged in a line in the first direction X. A plurality of frame units FUs disposed in the first direction X may be spaced apart from each other.

In the station body 30, a plurality of frame units FUs may be arranged in a line in the second direction Y. The plurality of frame units FUs disposed in the second direction Y may be disposed close to each other.

When the plurality of frame units FUs is disposed in the first direction X and the second direction Y, a gap G can be formed between some of the plurality of frame units FUs and the rest of the plurality of frame units FUs and the robot 10*a* can move through the gap G.

For example, when the plurality of frames FU includes four frames FU, the plurality of frame units FUs includes a left front frame LF, a right front frame RF, a left rear frame LR and a right rear frame RR.

In this case, the left front frame LF and the right front frame RF may be arranged in a row in the left and right direction Y, and the left rear frame LR and the right rear frame RR may be disposed in the left and right direction Y, a gap G may be formed between the left front frame LF and the left rear frame LR, and a gap G may be formed between the right front frame RF and the right rear frame RR.

The robot 10*a* can be guided along the guide rail and can carry the item B.

The robot 10*a* may comprise a first robot 50 and a second robot 60.

Each of the first robot 50 and the second robot 60 may have a driving unit.

The first robot 50 may be disposed to move in the first direction on the station body 30.

The first robot 50 may move in the first direction along the guide rail.

The first direction may be a horizontal direction, and the first direction may be a front and rear direction X. The first robot 50 may be arranged to move in the forward and backward direction X.

The first robot 50 may comprise a lifter 51. The lifter 51 may lift the station body 30, in particular, the object 41 placed on the frame 40.

The lifter 51 may be an object lifter or a first lifter that is disposed on the first robot 50 and lifts the object 41.

When the object 41 is lifted by the lifter 51, a gap may be formed between the object 41 and the seat plate, and in this state, the first robot 50 moves to the second robot 60. When moved, the first robot 50 can return to the second robot 60 without friction between the object 41 and the seating plate.

The first robot 50 may be moved to the second robot 60 and seated on the second robot 60. The size of the first robot 50 may be smaller than the size of the second robot 60. The width of the first robot 50 in the vertical direction (Z) may be smaller than the width of the second robot 60 in the vertical direction. The first robot 50 may be inserted into the second robot 60.

The first robot 60 may be moved by the second robot 60 while being seated on the second robot 60.

The first robot 50 may lift the item B in a third direction perpendicular to the first and second directions X and Y in a state in which the first robot 50 is separated from the second robot 60. The third direction may be a vertical direction Z. The first robot 50 may lift the item B in the vertical direction Z.

The second robot 60 may be disposed on the station body 30 to move in a second direction different from the first direction. The second robot 60 may move in a second direction different from the first direction along the guide rail.

The second direction may be orthogonal to the first direction. The second direction may be a horizontal direction, and the second direction may be a left and right direction Y. The second robot 60 may be disposed to move in the left and right direction Y.

The second robot 60 may include a seating body 61 (see FIG. 9) on which the first robot 50 is seated. The second robot 60 may form a first robot accommodating space S4 in which the first robot 50 is inserted and accommodated. The upper surface of the first robot accommodating space S4 may be open. The first robot accommodating space S4 may be opened in the first direction X.

The first robot 50 may be moved in a first direction and inserted into the first robot accommodating space S4, and may be seated on the seating body 61 and accommodated in the first robot accommodating space S4.

When the first robot 50 is inserted into the second robot 60, the height of the lower end of the first robot 50 may be higher than the height of the lower end of the second robot 60.

As shown in FIG. 9, the station body 30 may further include a guide rail for guiding the robot 10*a*. The robot 10*a* is guided along the guide rail and can carry the item B. A guide rail may be disposed on the frame 40.

The guide rail may comprise a first guide rail 48 and a second guide rail 49.

The first robot 50 may be guided by the first guide rail 48.

The first robot 50 can be moved along the first guide rail 48 in the second robot 60 and can be moved to the lower side of the object 41. The first robot 50 may lift the item B by lifting the object 41.

The first guide rail 48 may be coupled to the frame 40. The first guide rail 48 may be disposed long in the first direction and may guide the first robot 50 in the first direction. When the first direction is the front and rear direction X, the first guide rail 48 may be disposed long in the front and rear direction X.

The height of the first guide rail 48 may be lower than that of the object 41. As shown in FIG. 9, the first guide rail 48 may include a pair of rails 48*a* and 48*b* spaced apart in the second direction y.

The first guide rail 48 may be provided for each of a plurality of frame units FUs. A plurality of first guide rails 48 may be provided in the frame unit FU. The plurality of first guide rails 48 provided in the frame unit FU may be spaced apart in the third direction Z.

The first guide rails 48 may be provided in each of the storage spaces S2 and S3 in the frame unit FU, and a plurality of first guide rails 48 may be disposed in the frame unit FU.

As shown in FIG. 5, the plurality of first guide rails 48 can comprise a first lower guide rail 48*c* disposed below the middle plate 43 and a first upper guide rail 48*d* disposed below the upper plate 44.

The first lower guide rail 48*c* may be located in an upper region of the base space S1.

The first upper guide rail 48*d* may be located in an upper region of the lower space S2.

The first robot 50 may enter and be guided through the first lower guide rail 48*c*, move under the object 41 seated on the middle plate 43, lift the object 41 seated on the middle plate 43. The object 41 can be separated from the middle plate 43 by the first robot 50.

The robot 10*a* may move along the second guide rail 49 in a state in which the first robot 50 and the second robot 60 are not separated.

The second guide rail 49 may be coupled to at least one of the first guide rail 48 and the frame 40. The second guide rail 49 may be disposed long in the second direction and may guide the second robot 60 in the second direction. When the second direction is the left and right direction Y, the second guide rail 49 may be disposed long in the left and right direction Y.

The second guide rail 49 may be positioned in the gap G and allow the second robot 60 to be guided along the gap G in a second direction Y.

The height of the second guide rail 49 is lower than the height of the first guide rail 48, and the second robot 60 may be guided on the second guide rail 49. After being guided by the first guide rail 48, the first robot 50 can be inserted into the second robot 60, and the second robot 60 can be guided along the second guide rail 49 in the second direction Y.

As shown in FIG. 9, the second guide rail 49 may include a pair of rails 49*a* and 49*b* spaced apart in a first direction. The second guide rail 49 may further include reinforcing bodies respectively connected to the pair of rails 49*a* and 49*b*.

The second guide rail 49 may be provided for each of a plurality of frame units FUs.

A plurality of second guide rails 49 may be provided in the frame unit FU. The plurality of second guide rails 49 provided in the frame unit FU may be spaced apart in the third direction.

The second guide rails 49 may be provided in each of the storage spaces S2 and S3 in the frame unit FU, and a plurality of second guide rails 49 may be disposed in the single frame unit FU.

As shown in FIG. 5, the plurality of second guide rails 49 comprise a second lower guide rail 49*c* connected to the first lower guide rail 48*c* and a second upper guide rail 49*d* connected to the first upper guide rail 48*d*.

The robot system may further include a lifting mechanism 70, a pusher 80, and a conveyor 90.

The lifting mechanism 70 can lift the robot 10*a*. The robot 10*a* can be guided by the guide rail and moved to the lifting mechanism 70, and the lifting mechanism 70 can lift the robot 10*a* guided by the guide rail.

The robot 10*a* can be moved by the lifting mechanism 70 to a height at which the item B on the robot 10*a* can be moved to the conveyor 90 by the pusher 80, and this height can be the first height.

The robot 10*a* may be moved to a height capable of carrying the item B located in the lower space S2 or the upper space S3 by the lifting mechanism 70.

The robot 10*a* can be moved to a height at which the second robot 60 can be guided to the first lower guide rail

48*c* in a state where the first robot 50 is seated on the second robot 60, and this height can be a second height higher than the first height.

The robot 10*a* can be moved to a height at which the second robot 60 can be guided to the first upper guide rail 48*d* in a state where the first robot 50 is seated on the second robot 60, and this height can be a third height higher than the second height.

The lifting mechanism 70 may be disposed inside the station body 30. The lifting mechanism 70 may be disposed inside the outer case 32 together with the frame 40. The lifting mechanism 70 may be disposed next to frame 40.

The lifting mechanism 70 can lift the robot 10*a* guided by the guide rail.

The lifting mechanism 70 may include a lifting body 71 on which the robot 10*a* is seated and a lifting driving source 72 which lifts the lifting body 71.

The robot 10*a* may be in a state in which the first robot 50 is seated on the second robot 60 before carrying the item B, and the robot 10*a* can be raised to the height of the guide rail by the lifting mechanism 70 and can move along the guide rail after being raised to the height of the guide rail.

The robot 10*a* can transfer the item B in a state where the first robot 50 is seated on the second robot 60, and can be seated on the lifting mechanism 70, particularly the lifting body 71 and, the lifting mechanism 70 can lift the first robot 50 and the second robot 60 together by lifting the second robot 60.

The robot 10*a* may be moved from the guide rail to the lifting body 71 in a state where the first robot 50 is seated on the second robot 60.

The lifting body 71 may comprise a lifting plate 71*a* on which the robot 10*a* is seated, and a stopper 71*b* built on the lifting plate 71*a*. The lifting body 71 may further comprise a mounter 71*c* built on the lifting plate 71*a*.

The lifting plate 71*a* may be positioned approximately horizontally.

The stopper 71*b* may restrict the robot 10*a*, especially the second robot 60, so that the robot 10*a* placed on the lifting plate 71*a*. The robot 10*a* cannot move excessively.

The mounter 71*c* may be a pusher mounter for mounting the pusher 80.

The lifting driving source 72 may lower the lifting body 71 to a first height. The first height may be lower than the height of the upper surface of the conveyor 90. The first height is a height at which the height of the object 41 transported by the robot 10*a* seated on the lifting body 71 coincides with the upper surface of the conveyor 90 in the horizontal direction, or can be a height slightly higher than the upper surface of the conveyor 90.

The lifting driving source 72 may raise the lifting body 71 to a second height or a third height. The second height or the third height may be the same as the height of the guide rail, in particular, the second guide rail 49. The robot 10*a*, in particular, the second robot 60 can move from the lifting body 71 to the second guide rail 49, or from the second guide rail 49 to the lifting body 71 in the second direction.

The lifting driving source 72 may include a driving source such as a motor or a cylinder, and a power transmission member such as a gear or a linear guide capable of transmitting power of the driving source to the lifting body. The lifting drive source 72 is not limited to a motor or a cylinder, as long as it is configured to elevate the lifting body 71, and is applicable to all of them.

The second robot 60 enters the second lower guide rail 49*c* from the lifting mechanism 70 and can be guided to the second lower guide rail 49*c*, and the first robot 60 is moved to the first lower guide rail 48*c*, the first robot 60 enters the first lower guide rail 48*c* from the front or rear of the first lower guide rail 48*c*, and can be guided to the first lower guide rai 48*c*.

The second robot 60 enters the second upper guide rail 49*d* from the lifting mechanism 70 and can be guided to the second upper guide rail 49*d*, and the first robot 60 is moved to the first upper guide 48*d*, the first robot 60 enters the first upper guide rail 48*d* from the front or rear of the first upper guide rail 48*d*, and can be guided to the first upper guide rail 48*d*.

The lifting mechanism 70 may be a robot lifter or a second lifter that is received inside the outer case 32 and lifts the second robot 60 on which the first robot 50 is seated.

The pusher 80 may push the item B placed on the object 41. The pusher 80 may push the item B on the robot 10*a*.

The pusher 80 may push the article B on the robot 10*a* onto the conveyor 90 when the robot 10*a* is placed on the lifting body 71.

The pusher 80 may be disposed inside the station body 30. The pusher 80 may be disposed inside the outer case 32 together with the frame 40. The pusher 80 may be disposed next to the frame 40.

The pusher 80 may include a pushing body 81 disposed to move in a first direction and a pusher driving source 82 to move the pushing body 81 in the first direction. The pusher driving source 82 may advance and retreat the pushing body 81 in the forward and backward direction X at the rear of the pushing body 81.

The pushing body 81 is advanced upward of the object 41 placed on the robot 10*a* to push the item B onto the conveyor 90.

After the pushing body 81 pushes the item B onto the conveyor 90, the pushing body 81 may be retracted to a position where the object 41 is not caught in the vertical direction Z.

An example of the pusher 80 may be lifted together with the lifting body 71. The pusher 80 can be connected to the lifting body 71 and can be lifted together with the lifting body 71, and when the lifting body 71 is lowered to the first height, the article B can be push to the conveyor 90.

An example of the pusher driving source 82 may be mounted on the lifting body 71. In this case, the pusher driving source 82 may be mounted on the mounter 71*c* of the lifting body 71.

Other example of the pusher driving source 82 may not be mechanically connected to the lifting body 71. In this case, the pusher driving source 82 may be mounted on a pusher mounter (not shown) fixed to the station body 30. The pusher 80 does not move up and down together with the lifting body 71 and can push the item B onto the conveyor 90 while the height is fixed.

When the lifting body 71 is lowered to the first height, the pusher driving source 82 can move the pushing body 81 toward the upper side of the object 41 and can push the article B onto the conveyor 90.

The pusher driving source 82 may push the item B onto the conveyor 90 and then retract the pushing body 81 from the upper side of the object 41.

The conveyor 90 can transfer the item B pushed by the pusher 80 to the exit 34 of the station body 30, and the item B transferred to the exit 34 can be moved to the delivery robot 31.

The conveyor 90 may transfer the item B in the first direction. The conveyor 90 may be positioned behind exit 34 in the front and rear direction X. The conveyor 90 may be disposed between the lifting body 71 lowered to the first height and the outlet 34. The conveyor 90 may be disposed long in the front and rear direction X, and may transport the item B in the front and rear direction X.

Figure 10:
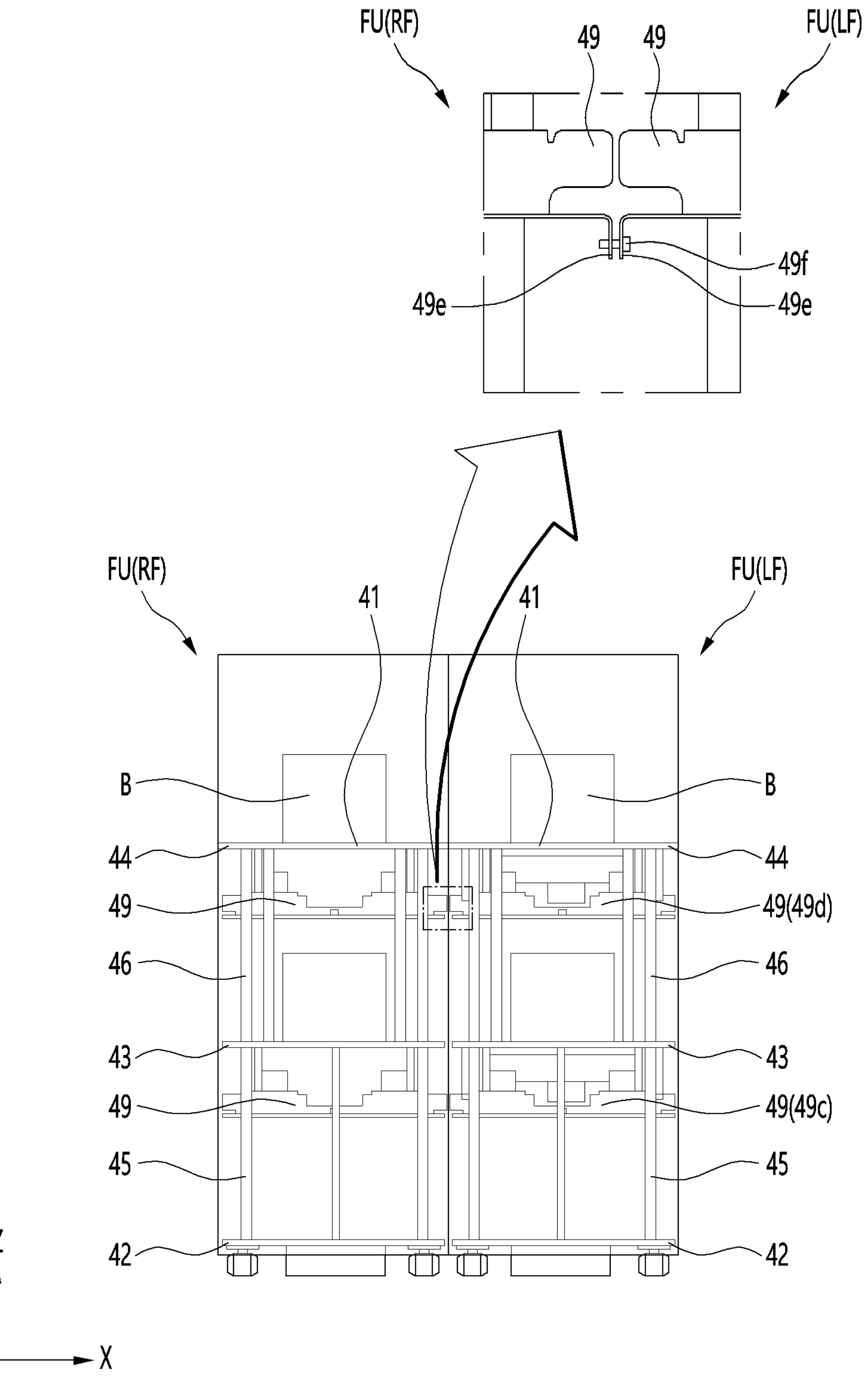
FIG. 10 is a view when a plurality of frames is combined.

FIG. 10 is a view when a plurality of frames is combined.

FIG. 10 is a diagram showing an example when a plurality of frame units FUs is arranged and combined in a row in the left and right direction X.

As shown in FIG. 10, guide rails 48 and 49 may be disposed in each of the plurality of frame units FUs, and the guide rail disposed in any one of the plurality of frame units FUs can be connected to the guide rail in an adjacent frame unit via a fastening member 49*f*.

For example, the second guide rail 49 of the left front frame LF and the second guide rail 49 of the right front frame RF may be connected to extend in the second direction.

Fastening portions 49*e* can be formed in the second guide rail 49 of the left front frame LF and the second guide rail 49 of the right front frame RF, respectively, and the second guide rail 49 of the left front frame LF and the second guide rail 49 of the right front frame RF are coupled to each other with fastening members 49*f* such as screws or bolts.

The second guide rail 49 of the left front frame LF and the second guide rail 49 of the right front frame RF may each have a round fastening portion 49*e* bent downward.

The fastening portion 49*e* may be formed at an end of the second guide rail 49 in the longitudinal direction.

The fastening portion 49*e* of the second guide rail 49 provided on the left front frame LF and the fastening part 49*e* of the second guide rail 49 provided on the right front frame RF are mutually connected in the second direction. They may face each other, and fastening members 49*f* such as screws or bolts may fasten adjacent fastening portions 49*e*. When the fastening portion 49*e* is fastened with the fastening member 49*f*, the plurality of second guide rails 49 arranged in a row in the second direction can be maintained horizontally.

The robot system can expand the number of frame units FUs to three, four, etc. by sequentially arranging a plurality of frame units FUs in a line and fastening adjacent frame units FUs by means of a fastening member 49*f* and the frame unit FU can be extended by a necessary number.

Figure 11:
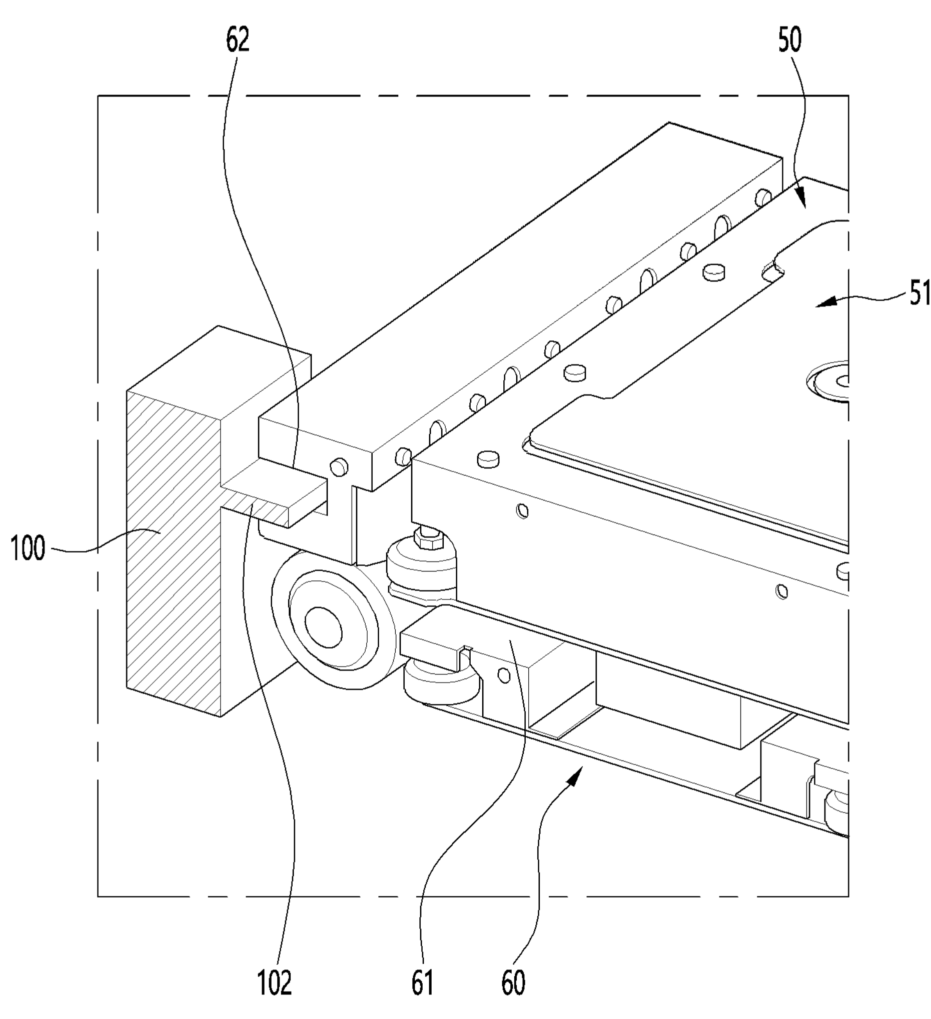
FIG. 11 is a perspective view when the robot according to the present embodiment is moved to a robot charger.

FIG. 11 is a perspective view when the robot according to the present embodiment is moved to a robot charger.

The robot system may comprise a robot charger 100 that charges at least one of the first robot 50 and the second robot 60.

The robot charger 100 may be disposed in the outer case 32 or in the frame 40.

Depending on the charging method, the robot charger 100 may be a contact charger or a non-contact charger.

An example of the robot charger 100 is to charge the robot 10*a* in a contact charging method in which the charging terminal 62 provided in the robot 10*a* can come in contact with the supply terminal 102 provided in the robot charger 100.

Another example of the robot charger 100 may charge the robot 10*a* in a non-contact charging method that supplies power based on magnetic field induction.

Depending on the number of robot chargers 100, the robot charger 100 may be a single charger or a dual charger.

An example of the robot charger 100 may be a robot charger arranged to charge one of the second robots 60 among the first robots 50.

In the robot system, the robot charger 100 may charge the second robot 60 and the second robot 60 may charge the first robot 50. In this case, the robot charger 100 may be disposed on the movement path of the second robot 60. The second robot 60 may be provided with a charging terminal 62, and the second robot 60 may be moved to the robot charger 100 and charged.

Another example of the robot charger 100 may comprise a first robot charger disposed in the station body 30 to charge the first robot 50, and a second robot charger disposed in the station body 30 to charge the second robot 60. In this case, the first robot charger may be disposed on the movement path of the first robot 50, and the second robot charger may be disposed on the movement path of the second robot 60.

When the robot system further comprises the first robot charger and the second robot charger, the first robot 50 and the second robot 60 may be charged independently.

Figure 12:
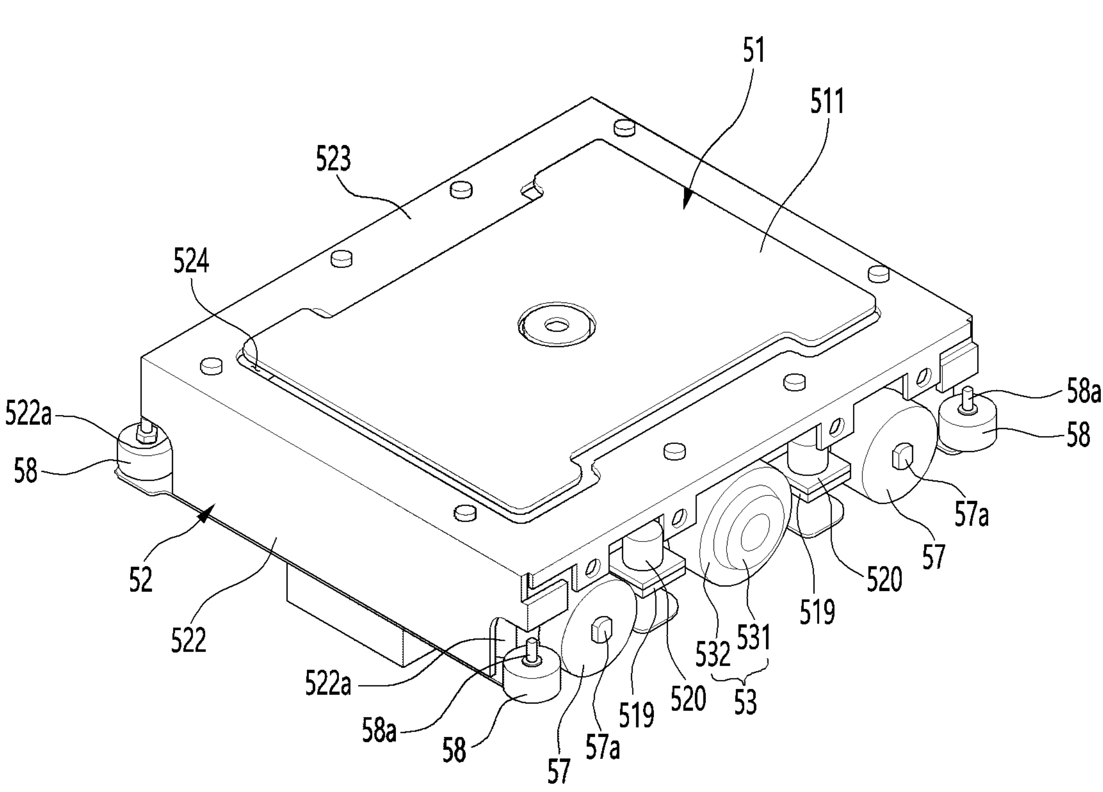
FIG. 12 is a perspective view of a first robot according to this embodiment.
Figure 13:
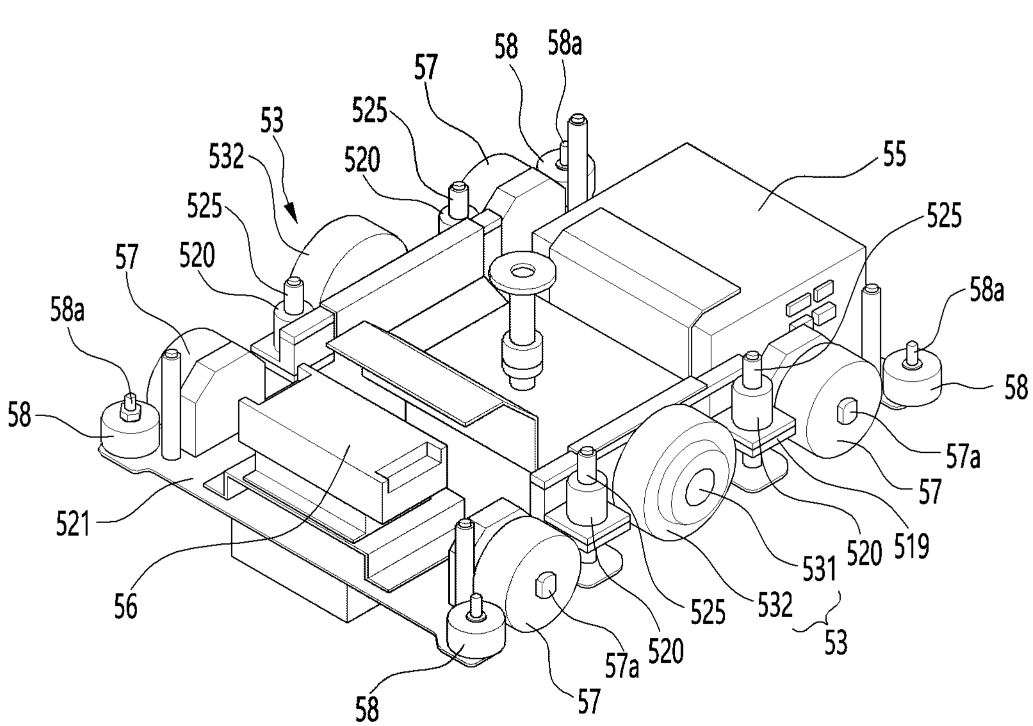
FIG. 13 is a perspective view showing the inside of a first robot according to this embodiment.
Figure 14:
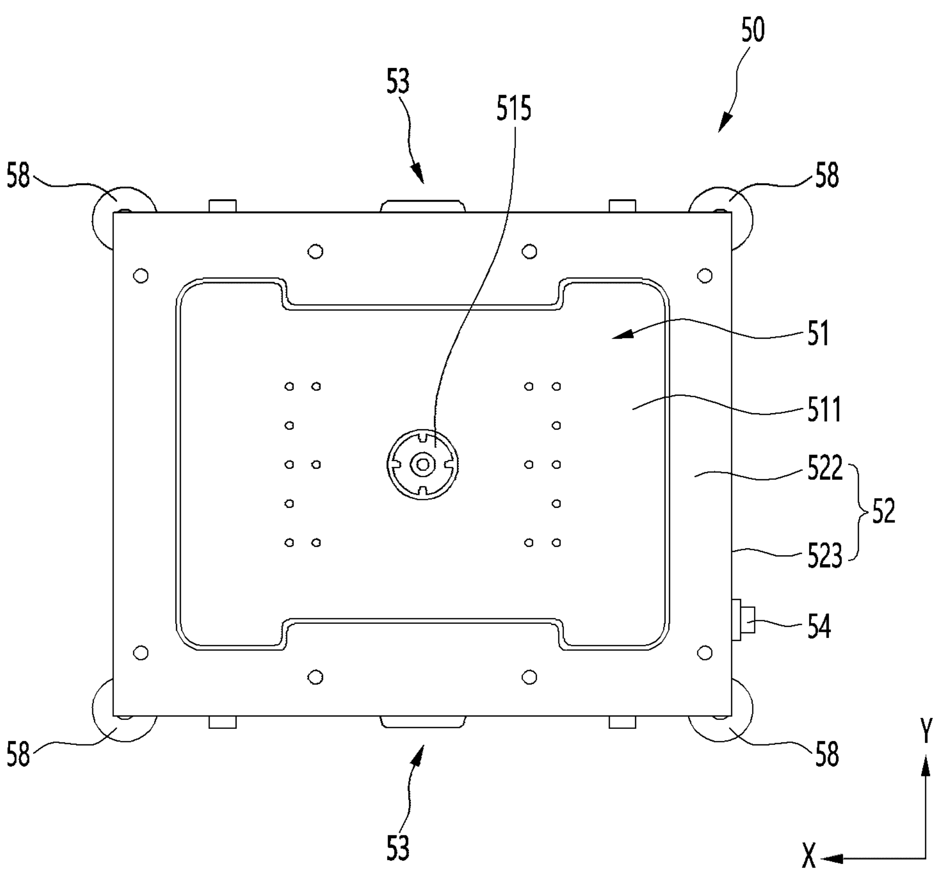
FIG. 14 is a plan view of a first robot according to this embodiment.
Figure 15:
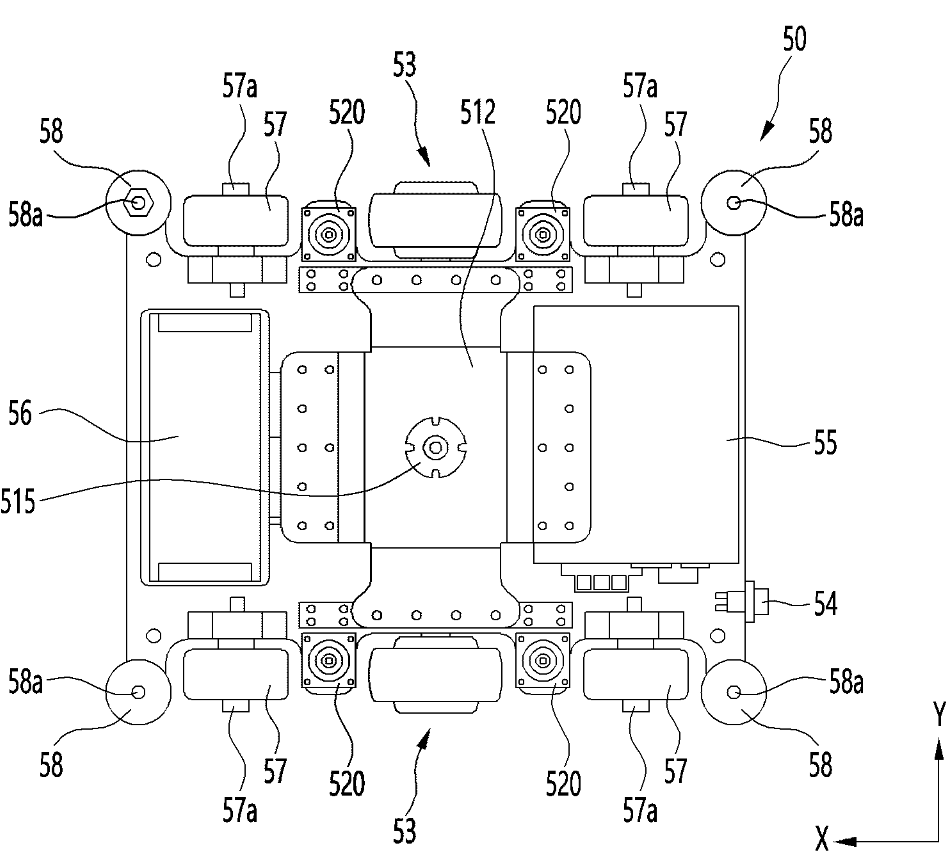
FIG. 15 is a plan view showing the inside of a first robot according to this embodiment.
Figure 16:
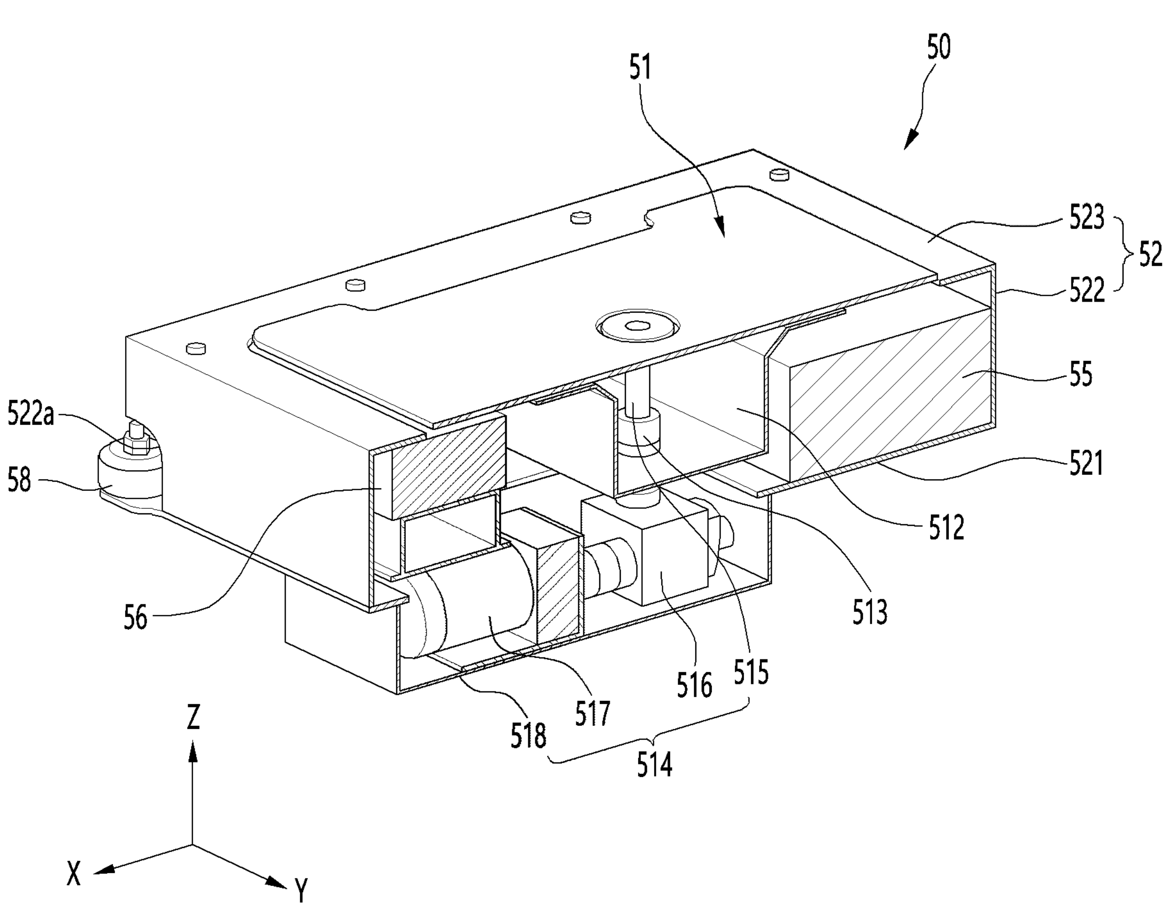
FIG. 16 is a perspective view of a first robot according to this embodiment.
Figure 17:
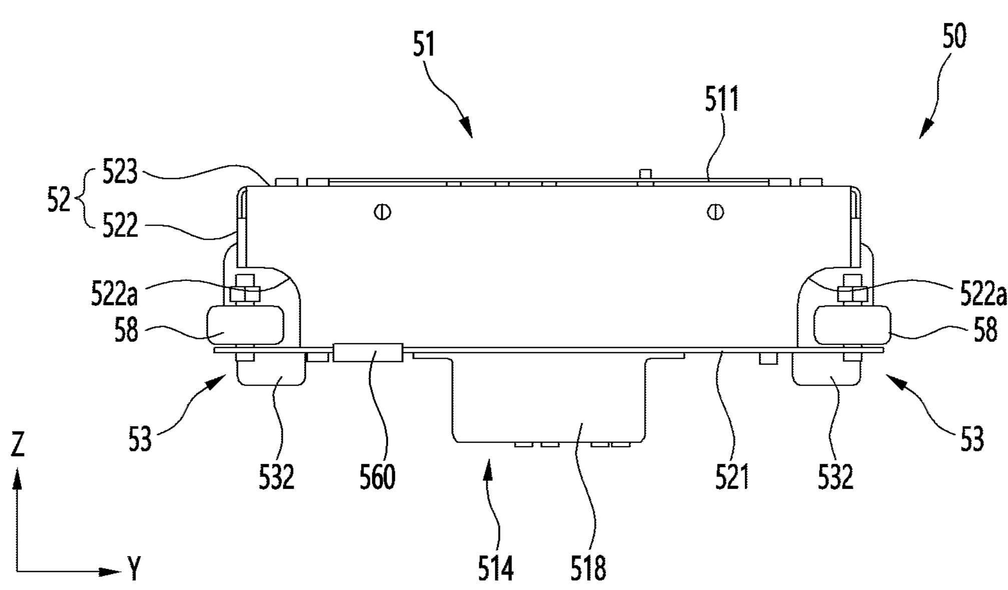
FIG. 17 is a front view of a first robot according to this embodiment.

FIG. 12 is a perspective view of a first robot according to this embodiment, FIG. 13 is a perspective view showing the inside of a first robot according to this embodiment, FIG. 14 is a plan view of a first robot according to this embodiment, FIG. 15 is a plan view showing the inside of a first robot according to this embodiment, FIG. 16 is a perspective view of a first robot according to this embodiment, FIG. 17 is a front view of a first robot according to this embodiment.

The first robot 50 may comprise a lifter 51, a first robot body 52 on which the lifter 51 is disposed, an in-wheel motor 53 disposed on the first robot body 52, and a proximity sensor 54 and a first battery 55 disposed at the first robot body 52.

The lifter 51 may comprise a lift plate 511 that moves up and down.

The lift plate 511 may come into contact with the object 41 and lift the object 41.

The lifter 51 may comprise a guide plate 512 coupled to the lift plate 511, a lift bush 513 disposed on the guide plate 512, and an actuator 514 disposed on the first robot body 52. The actuator 514 can lift the lift bush 513 up and down.

The guide plate 512 may be coupled to the lift plate 511 and may move up and down together with the lift plate 511.

The lift bush 513 may be coupled to the guide plate 512 by a fastening member such as a screw, and may be moved up and down together with the guide plate 512.

The actuator 514 may be a driving unit that lifts the lift plate 511.

The actuator 514 may comprise a drive shaft 515 connected to the lift bush 513. The drive shaft 515 may be disposed long in the vertical direction Z.

The drive shaft 515 may be a lift screw jack that lifts the lift bush 513.

A screw may be formed on an outer circumference of the drive shaft 515, and the lift bush 513 may be guided along the outer circumference of the drive shaft 515 in a vertical direction Z. A male screw portion may be formed on an outer circumference of the drive shaft 515, and a female screw portion may be formed on an inner circumference of the lift bush 513.

The drive shaft 515 may pass through the guide plate 512.

The actuator 514 may comprise a gearbox 516 connected to the lower part of the drive shaft 515, a motor 517 connected to the gearbox 516, and a lower cover 518 accommodating the gearbox 515 and the motor 517.

When the motor 517 is driven, the rotational motion of the motor 517 is transmitted to the drive shaft 515 through the gear box 516 to rotate the drive shaft 515, and the lift bush 513 can convert the rotational motion of the linear motion and lift the guide plate 512, the lift plate 511 connected to the guide plate 512 in the vertical direction Z.

The first robot body 52 may form the exterior of the first robot 50.

A space may be formed inside the first robot body 52, and the guide plate 512 and the battery 55 may be accommodated in the space.

The first robot body 52 may comprise a lower body 521, a side body 522, and a top body 523. The space may be formed by the lower body 521, the side body 522, and the top body 523.

The lower body 521 may be coupled to the lower cover 518.

The side body 522 may extend vertically from the lower body 521.

The top cover 523 may extend horizontally from the side body 522. An opening 524 may be formed in the top cover 523.

The lifter 51 may comprise an elevating body 519 connected to the guide plate 512.

The lifter 51 may further comprise a lift guide bush 520. The lift guide bush 520 may be connected to the elevating body 519 and may be elevated along the guide shaft 525 formed on the second robot body 52. The lift guide bush 520 may lift and guide the guide plate 512 while moving up and down along the guide axis 525.

A plurality of lift guide bushes 520 and guide shafts 515 may be provided. Each of the plurality of lift guide bushes 520 and the plurality of guide shafts 525 may be spaced apart in the front and rear direction X and the left and right direction Y.

The in-wheel motors 53 may be provided on both left and right sides of the first robot body 52, respectively. The in-wheel motor 53 may comprise a drive motor 531 mounted on the side body 522 of the first robot body 52 and a wheel 532 connected the rotation shaft of the drive motor 531 and rotated by the drive motor 531.

The proximity sensor 54 may be disposed on the side body 522 of the first robot body 52.

An example of proximity sensor 54 may be an infrared proximity sensor.

The first battery 55 may be disposed in a space formed inside the first robot body 52 and may be protected by the first robot body 52.

Figure 21:
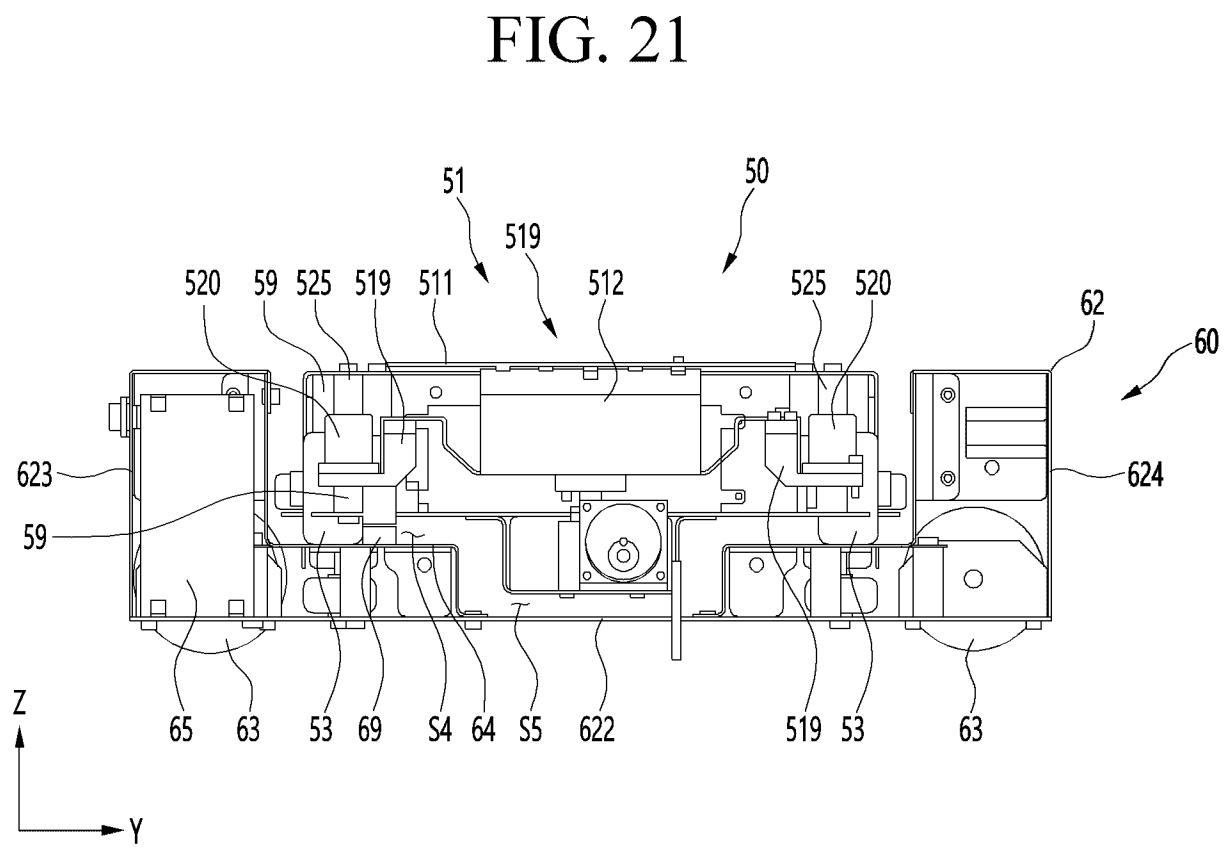

The first battery 55 may be electrically connected to the charging terminal 59 of the first robot 50 (see FIG. 21).

The first robot 50 may comprise a magnet 560 installed on the bottom of the first robot body 52.

The magnet 560 may be disposed on the lower body 521 of the first robot body 52. The magnet 560 may be disposed on the upper surface of the lower body 521 or disposed on the lower surface of the lower body 521.

The first robot 50 may further comprise a first control box 56.

The first control box 56 may be accommodated in a space formed inside the first robot body 52.

The first control box 56 may be spaced apart from the battery 55. The first control box 56 and the battery 55 may be spaced apart in the front and rear direction X and the guide plate 512 of the lifter 51 is interposed therebetween.

The first control box 56 may comprise a control unit or a control PCB (hereinafter, referred to as a control PCB) for controlling the first robot 50. The control PCB may be connected to the proximity sensor 54 and the battery 55, and can control the driving motor 531 according to a signal value from the proximity sensor 54.

The first robot 50 may further comprise an auxiliary wheel 57 and a guide roller 58.

The auxiliary wheel 57 may be rotatably disposed on the first robot body 52.

The auxiliary wheel 57 may rotate about a horizontal axis **57*a* provided to the first robot body 52. The auxiliary wheel 57 may be spaced apart from the driving motor 52** in a first direction.

The guide roller 58 may be rotatably disposed on the first robot body 52.

The guide roller 58 may be rotatably disposed around a vertical axis **58*a* provided to the first robot body 52**.

When the guide roller 58 is disposed on the vertical axis **58*a*, a portion of the guide roller 58 can be accommodated in the recess 522*a* formed in the side body 522 of the first robot body 52, and the remainder of the guide roller 58 may be exposed to the outside of the first robot body 52**.

The guide roller 58 may roll along the first guide rail 48 or the second robot 60 when the first robot 50 moves, and may help the first robot 50 move smoothly.

A plurality of guide rollers 58 may be provided. The plurality of guide rollers 58 may be disposed at each of the four corners, and may minimize resistance generated when the first robot 50 rubs against the first guide rail 48 or the second robot 60. When the first robot 50 enters the second robot 60, the left and right balance of the first robot 50 can be adjusted to help the second robot 60 enter easily.

Figure 18:
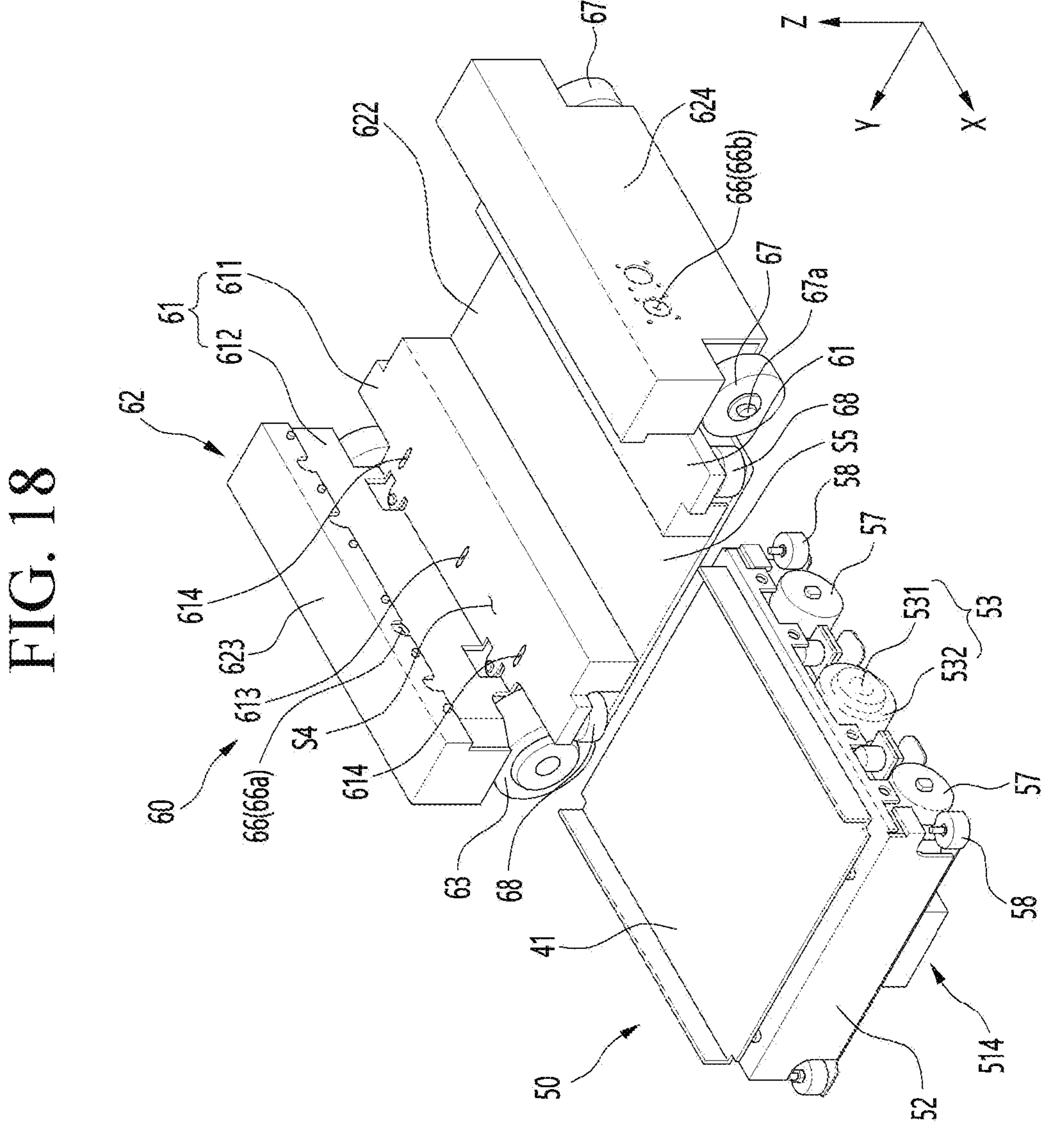
FIG. 18 is a perspective view when the first robot is separated from the second robot according to the present embodiment.
Figure 19:
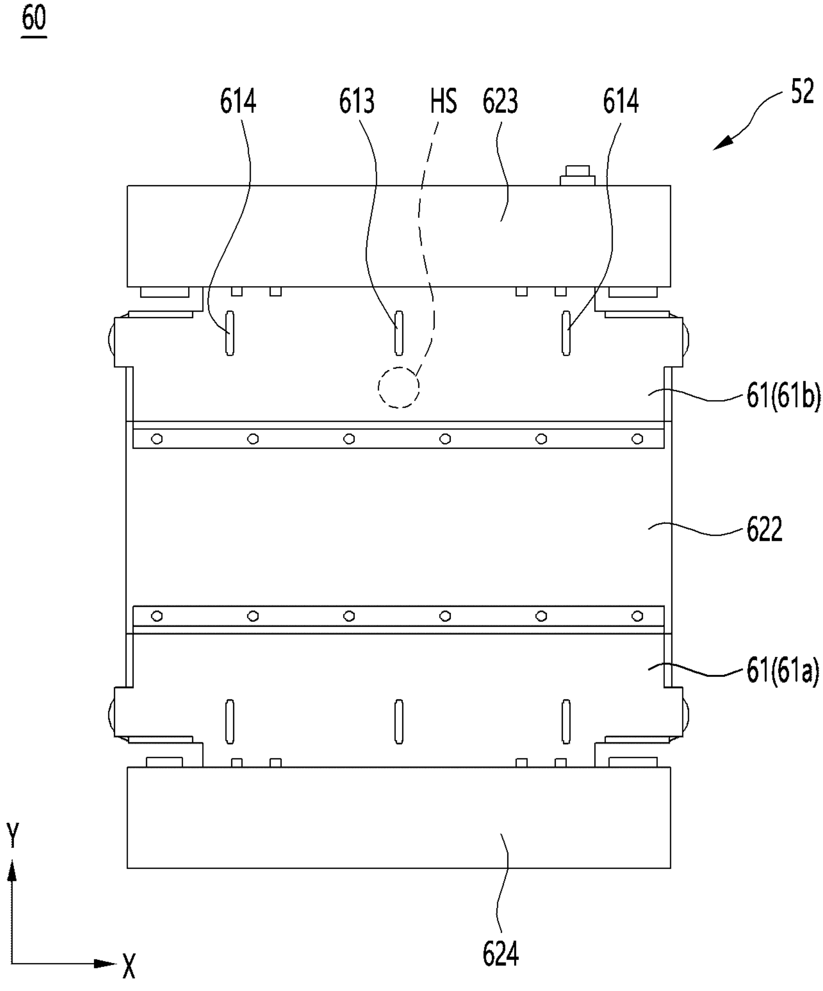
FIG. 19 is a plan view showing a second robot according to this embodiment.
Figure 20:
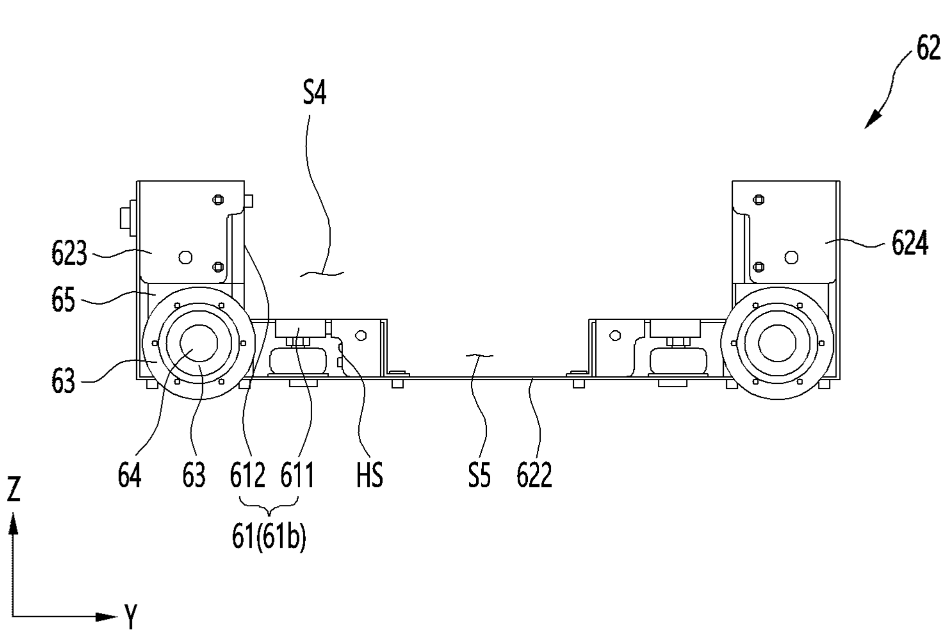
FIG. 20 is a front view showing the inside of the second robot according to the present embodiment.

FIG. 18 is a perspective view when the first robot is separated from the second robot according to the present embodiment, FIG. 19 is a plan view showing a second robot according to this embodiment, FIG. 20 is a front view showing the inside of the second robot according to the present embodiment, FIG. 21 is a cross-sectional view when the first robot is seated on the second robot according to the present embodiment.

The second robot 60 may comprise a seating body 61 on which the first robot 50 is seated.

A first robot accommodating space S4 in which at least a portion of the first robot 50 may be accommodated is formed in the seating body 61.

The seating body 61 may comprise a lower body 611 on which the first robot 50 is seated, and a guide sidewall 612 bent vertically in the lower body 611.

The guide sidewall 612 may guide the first robot 50 so that the first robot 50 is accurately seated horizontally when the first robot 50 is moved to the first robot accommodating space S4.

The guide sidewall 612 may include an introduction portion into which the first robot 50 enters, and the introduction portion may be a gradient portion or an extension portion into which the first robot 50 is naturally pushed.

As shown in FIG. 19, a pair of seating bodies 61 may be provided to the second robot 60. Each of the pair of seating bodies **61*a* and 61*b* may be long in the front and rear direction X. The pair of seating bodies 61*a* and 61*b*** may be spaced apart in the left and right directions Y.

A wheel accommodating portion 613 may be formed in the seating body 61 to which a portion of the wheel 532 of the first robot 50 is inserted and caught. An example of the wheel accommodating portion 613 may be a slit or groove formed long in the left and right direction Y of the seating body 61. The wheel accommodating portion 613 may be a stopping jaw of the wheel 532 when the first robot 50 is stopped.

An auxiliary wheel accommodating portion 614 may be formed in the seating body 61 to which a portion of the auxiliary wheel 57 of the first robot 50 is inserted and caught. An example of the auxiliary wheel accommodating portion 614 may be a slit or groove formed long in the left and right direction Y of the seating body 61. The auxiliary wheel accommodating portion 614 may be spaced apart from the wheel accommodating portion 613 in the front and rear direction X. The auxiliary wheel accommodating portion 614 may be a stopping jaw of the auxiliary wheel 57 when the first robot 50 is stopped.

The seating body 61 may be a first robot coupling body to which the first robot 50 is detachably coupled.

The second robot 60 may comprise a second robot body 62 on which a seating body 61 is disposed.

The second robot body 62 may form the exterior of the second robot 60.

The second robot body 62 may comprise a lower body 622 and a pair of side bodies 623 and 624.

A drive unit accommodating space S5 in which the drive unit (that is, the actuator 54) of the lifter 51 is accommodated may be formed in the second robot 60.

The drive unit accommodating space S5 may be formed on the upper side of the lower body 622. The drive unit accommodating space S5 may be formed between the pair of seating bodies 61.

Each of the pair of side bodies 623 and 624 may be formed long in the front and rear direction X. The pair of side bodies 623 and 624 may be spaced apart in the left and right directions Y.

The second robot 60 may comprise a wheel 63 disposed to be rotated on the second robot body 62, a motor 64 for rotating the wheel 63, a battery 65 disposed on the second robot body 62, and a proximity sensor 66 disposed on the second robot body 62.

The wheel 63 may be a driving wheel for driving the second robot 60.

The motor 64 may include a rotation shaft that rotates the wheel 63.

The wheel 63 and the motor 64 may constitute an in-wheel motor.

The second battery 65 may be disposed inside the second robot body 62. The charge capacity of the second battery 65 may be greater than the charge capacity of the first battery 55. The size of the second battery 65 may be larger than the size of the first battery 55.

A plurality of proximity sensors 66 may be provided in the second robot body 62. The plurality of proximity sensors 66 may comprise an inner proximity sensor 66*a* that senses the first robot 50 and an outer proximity sensor 66*b* disposed on the second robot body 62.

The inner proximity sensor 66*a* may be disposed facing the first robot accommodating space S4. When the first robot 50 is inserted into the first robot accommodating space S4, the inner proximity sensor 66*a* may detect the first robot 50. An example of the inner proximity sensor 66*a* may be an infrared proximity sensor.

A plurality of inner proximity sensors 66*a* may be provided in the moving direction of the first robot 50.

The outer proximity sensor 66*b* may be disposed on an outer surface of the robot body 62. An example of the outer proximity sensor 66*b* may be an infrared proximity sensor.

The second robot 60 may control the motor 64 according to the sensing value of the outer proximity sensor 66*b*.

The second robot 60 may further comprise an auxiliary wheel 67 disposed on the second robot body 62.

The auxiliary wheel 67 may be disposed to be spaced apart from the wheel 63. The wheel 63 may be disposed on one side of the left and right sides of the second robot body 62, and the auxiliary wheel 67 may be disposed on the other side of the left and right sides of the second robot body 62. The auxiliary wheel 67 may be rotated about a horizontal axis 67*a*.

The second robot 60 may further comprise a guide roller 68 disposed on the seating body 61 and rolling along the station body 30.

The guide roller 68 may be rotatably disposed around a vertical axis disposed on the seating body 61.

The guide roller 58 may roll along the second guide rail 49 when the second robot 60 moves, and may help the second robot 60 move smoothly.

The second robot 60 may further comprise a hall sensor HS for sensing the magnet 560.

The second robot 60 may sense the proximity or position of the first robot 50 according to the sensing value of the hall sensor HS. When the Hall sensor HS senses the magnet 560, the first robot 50 may be decelerated or stopped.

The first robot 50 may be decelerated or stopped according to a sensing value of the inner proximity sensor 66*a* or the hall sensor HS. For example, when the inner proximity sensor 66*a* senses the first robot 50, the first robot 50 can decelerate. When the hall sensor HS senses the magnet 560, the first robot 50 can stop.

As shown in FIG. 21, a charging terminal 59 can be disposed in the first robot 50 and a supply terminal 69 to which the charging terminal 59 may come into contact can be disposed in the second robot 60.

The charging terminal 59 of the first robot 50 may be mounted on the elevating body 519, and the charging terminal 59 of the first robot 50 may moves up and down together with the guide plate 512 of the lifter 51.

The supply terminal 69 may be electrically connected to the second battery 65. The supply terminal 69 may come into contact with the charging terminal 59 when the charging terminal 59 of the first robot 50 descends.

Hereinafter, the operation of the robot system configured as described above will be described.

Figure 22:
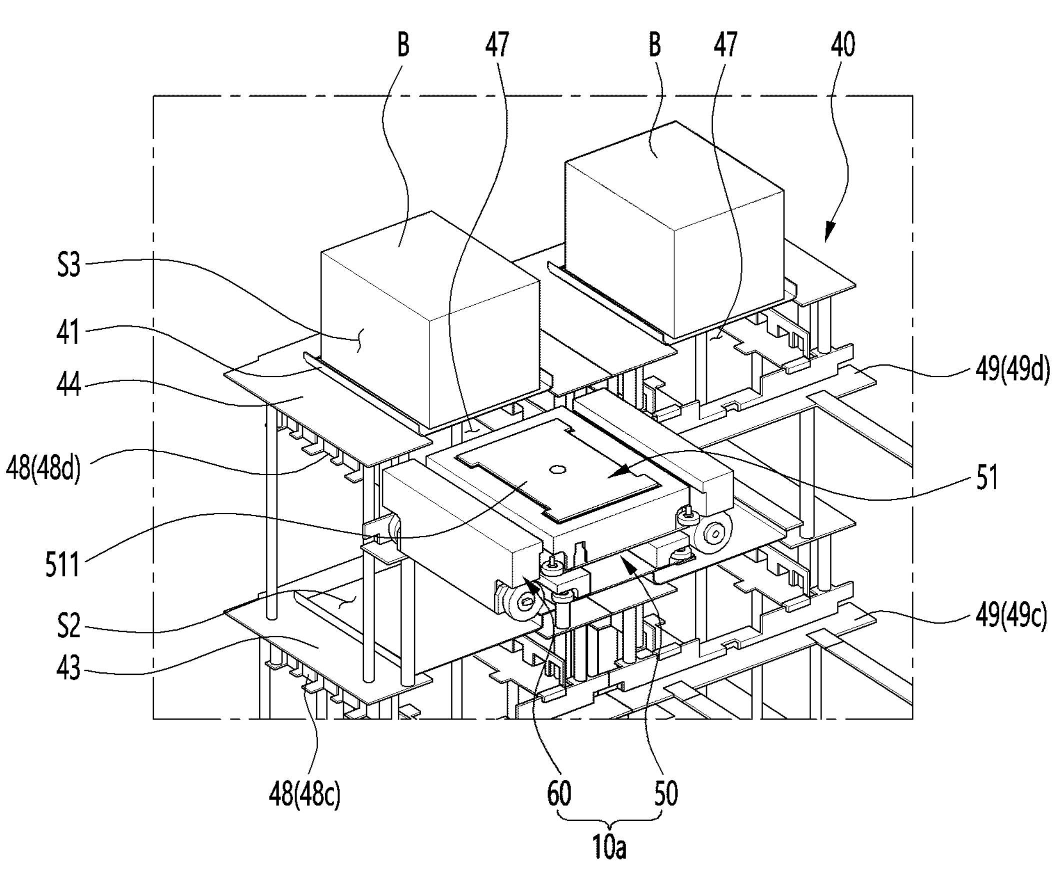
FIG. 22 is a perspective view when the second robot moves the first robot near the object according to the present embodiment.
Figure 23:
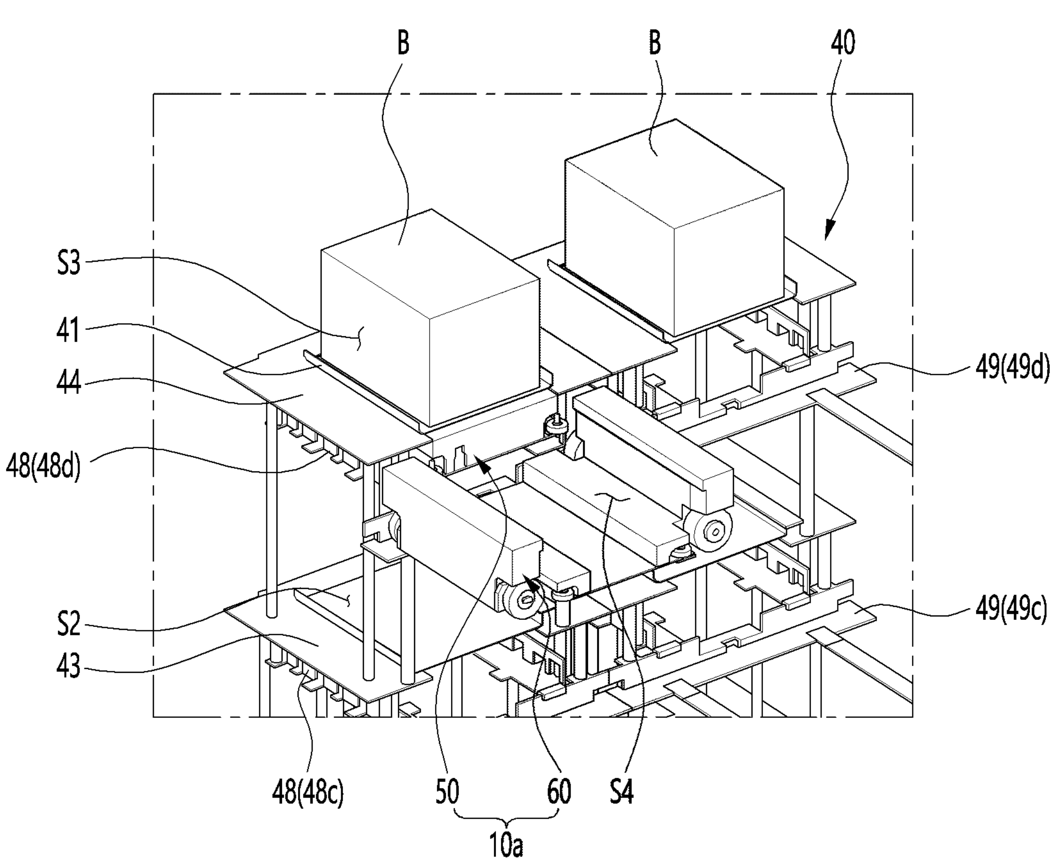
FIG. 23 is a perspective view when the first robot shown in FIG. 22 moves to the lower side of the object.
Figure 24:
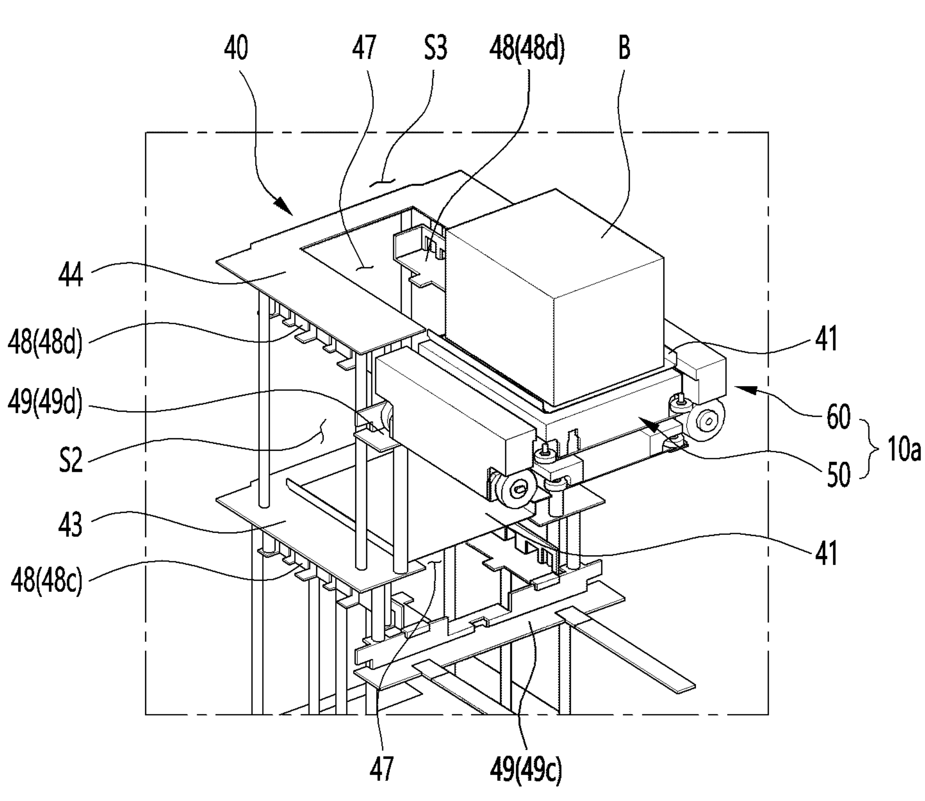
FIG. 24 is a perspective view when the first robot shown in FIG. 23 returns to the second robot after lifting the object.

FIG. 22 is a perspective view when the second robot moves the first robot to near the object according to the present embodiment, FIG. 23 is a perspective view when the first robot shown in FIG. 22 moves to the lower side of the object, and FIG. 24 is a perspective view when the first robot shown in FIG. 23 returns to the second robot after lifting the object.

An example in which the item B accommodated in the upper space S3 of the station body 30 is moved to the outlet 34 of the station body 30 will be described.

First, the lifting mechanism 70 may lift the lifting body 71 to the height of the second upper guide rail 49*d* (i.e., the third height), and the second robot 60 may be lifted together with the first robot 50.

If the lifting body 71 finishes rising to the height of the second upper guide rail 49*d*, the lifting mechanism 70 can complete the lifting of the lifting body 71, and the second robot 60 moves the second upper guide rail 49*d* in the second direction.

The first robot 50 can move in the second direction together with the second robot 60, and if the second robot 60 is positioned at a position corresponding to the first upper guide rail 48*d*, as shown in FIG. 22, the moving of the second robot 60 can be completed, and the second robot 60 stops.

If the second robot 60 is stopped, the first robot 50 can be separated from the second robot 60, and as shown in FIG. 23, and can be moved to the first upper guide rail 48*d* in the first direction.

The first robot 50 may move to a lower position of the object 41 and may stop when the movement to the lower position of the object 41 is completed.

After the first robot 50 stops, the first robot 50 can control the lift 51 in the lifting mode, and the lifting plate 511 passes through the opening 47 of the frame 40 and comes into contact with the object 41 and the object 41 can be raised.

If the lifting of the object 41 is completed, the first robot 50 may move in the first direction along the first upper guide rail 48*d* in a state in which the object 41 is raised, as shown in FIG. 24, the first robot 50 can be inserted into the second robot 60 and can be combined with the second robot 60.

When the first robot 50 is completely coupled to the second robot 60, the first robot 50 may be stopped, and if the first robot 50 is stopped, the second robot 60 can move along the second upper guide rail 49*d* in the second direction, and can be seated on the lifting body 71.

If the second robot 60 is completely seated on the lifting body 71, the second robot 60 can be stopped and the movement of the second robot 60 can be completed.

If the movement of the second robot 60 is completed, the lifting mechanism 70 can lower the lifting body 71, and in a state in which the first robot 50 is coupled with the second robot 60, the first robot 50 can descend together with the second robot 60.

The lifting mechanism 70 can lower the lifting body 71 to a height (i.e., a first height) at which the item B on the first robot 50 can be moved to the conveyor 90, and when the lifting body 71 is completely lowered to the first height, the lifting mechanism 70 may stop lowering the lifting body 71.

If the lifting body 71 is stopped, the pusher 80 may advance and retract the pushing body 81, and the item B placed on the object 41 is pushed to conveyor 90 by the pushing body 81.

The conveyor 90 may transport the item B to the exit 34 of the station body 30, and the item transported to the exit 43 may be transferred to the delivery robot 31 (see FIG. 4).

The robot system can operate to move the item B accommodated in the lower space S2 of the station body 30 to the outlet 34 of the station body 30, and the lifting mechanism 70 can lift the lifting body 71 to the height of the second lower guide rail 49*c* (i.e., the second height), and the second robot 60 placed on the lifting body 71 can be lifted together with the first robot 50.

If the lifting body 71 finishes rising to the height of the second lower guide rail 49*c*, the lifting mechanism 70 can complete the lifting of the lifting body 71, and the second robot 60 moves along the second lower guide rail 49*c* in the second direction.

The movement of the second robot 60 and the movement of the first robot 60 may be the same as when the item B accommodated in the upper space S3 is transported. Hereinafter, detailed descriptions thereof will be omitted to avoid repeat.

The first robot 50 may transport the item B accommodated in the lower space S2 to the upper side of the second robot 60, and the second robot 60 can be moved to the lifting body 71 of the lifting mechanism 70.

The operation of the lifting mechanism 70, the pusher 80, and the conveyor 90 may be the same as when the item B accommodated in the upper space S3 is transported. Hereinafter, detailed description thereof will be omitted to avoid repeat.

The item B stored in the lower space S2 can be transported to the exit 34 of the station body 30, and the item transported to the exit 43 can be transferred to the delivery robot 31.

The robot system is not limited to the above embodiment, and one storage space S2 may be formed in the frame unit FU. In this case, the robot system does not include a lifting mechanism 70. When the item B on the robot 10*a* guided by the second guide rail 49 is moved forward of the pusher 80, the pusher 80 may push the item B forward.

The robot system is not limited to the above embodiment, and the conveyor 90 is not accommodated inside the outer case 32, and the pusher 80 can move the item B on the robot 10*a* to the delivery robot 31.

According to this embodiment, the robot system comprises a first robot moving in a first direction along a first guide rail and a second robot moving in a second direction along a second guide rail, and since the first robot moves a lower side of an object, a storage space formed in the station body can be maximumly utilized, and item accommodated in the storage space can be maximized.

In addition, since the first robot carries the object, various types of items can be stored and transported.

In addition, since the first robot is guided on the first guide rail and the second robot is guided on the second guide rail having a lower height than a height of the first guide rail, the first robot guided by the first guide rail can stably enter in the second robot, and the first robot seated on the second robot can move stably to the first guide rail.

In addition, there is no need to connect a separate cable for supplying power to the first robot or the second robot, and malfunction of the first robot and the second robot due to the cable can be minimized.

In addition, since the second robot on which the first robot is seated can be lifted by the lifting mechanism, the structure of the robot system is simpler than when the first robot and the second robot are respectively lifted.

In addition, since the item can be moved to the conveyor by the pusher and the conveyor can transfer the item to the exit of the station body, the item can be transferred to the exit of the station body with high reliability.

In addition, the hall sensor of the second robot can sense the magnet of the first robot, and the position of the first robot can be sensed more accurately with a simple structure of the hall sensor and the magnet.

In addition, since the first robot can be charged by the second robot, the structure of the station body is simpler than when chargers for the first and second robots are respectively installed in the station body.

In addition, since the wheels of the first robot are caught and restrained in the wheel accommodating portion formed in the seating body of the second robot, the stability of the first robot is high against shaking caused by movement or lifting of the second robot.

In addition, the first robot can stably enter the first guide rail or the second robot by the guide rollers installed in the first robot, and the left and right balance of the first robot can be adjusted.

The above-disclosed subject matter is to be considered illustrative, and not restrictive, and the appended claims are intended to cover all such modifications, enhancements, and other implementations, which fall within the scope of the present disclosure.

Thus, the implementation of the present disclosure is to be considered illustrative, and not restrictive.

Therefore, the scope of the present disclosure is defined not by the detailed description of the invention but by the appended claims, and all differences within the scope will be construed as being included in the present disclosure.

What is claimed is:

1. A robot system comprising:

a station body;

a carrier located in the station body;

a first robot being configured to move in a first direction in the station body, the first robot including:

a first robot body;

a lifter configured to lift the carrier relative to the station body, the lifter being located on the first robot body; and a wheel having an in-wheel motor connected to the first robot body; and a second robot configured to move in the station body in a second direction different from the first direction, the second robot having a seating body on which the first robot is seatable.

2. The robot system of claim 1, wherein the station body includes a first guide rail to guide movement of the first robot, the first guide rail being located below the carrier.

3. The robot system of claim 2, wherein the station body includes a second guide rail to guide movement of the second robot, the second guide rail being located below the first guide rail.

4. The robot system of claim 3, wherein the first guide rail extends in a front and rear direction of the station body, and wherein the second guide rail extends in a left and right direction of the station body.

5. The robot system of claim 1, further comprising a first robot charger configured to charge the first robot, the first robot charger being located in the station body.

6. The robot system of claim 5, further comprising a second robot charger configured to charge the second robot, the second robot charger being located in the station body.

7. The robot system of claim 1, wherein the station body includes an outlet, and wherein the robot system further comprises:

a pusher configured to push an item located on the carrier; and a conveyor configured to transfer the item pushed by the pusher to the outlet of the station body.

8. The robot system of claim 1, wherein the first robot further comprises a proximity sensor located on the first robot body.

9. The robot system of claim 1, wherein the first robot further comprises a guide roller located on the first robot body, the guide roller configured to roll along the station body or the second robot.

10. The robot system of claim 1, wherein the first robot further comprises a magnet located on a bottom of the first robot body.

11. The robot system of claim 10, wherein the second robot further comprises a Hall sensor configured to sense the magnet of the first robot.

12. The robot system of claim 8, wherein the first robot further comprises:

a battery located in the first robot body; and a charging terminal electrically connected to the first battery.

13. The robot system of claim 12, wherein the lifter includes a lift plate, and wherein the charging terminal is configured to be lifted together with the lift plate.

14. The robot system of claim 12, wherein the second robot further comprises a supply terminal configured to be contacted by the charging terminal of the first robot.

15. The robot system of claim 8, wherein the lifter comprises:

a lift plate configured to lift the carrier;

a guide plate connected to the lift plate;

a lift bush located on the guide plate; and an actuator located on the first robot body, the actuator being configured to lift the lift bush.

16. The robot system of claim 1, wherein the seating body of the second robot defines a first robot accommodating space configured to accommodate at least a portion of the first robot.

17. The robot system of claim 1, wherein the first robot comprises a wheel, and wherein a wheel accommodating portion is provided in the seating body, the wheel accommodating portion being configured to receive a portion of the wheel of the first robot.

18. The robot system of claim 1, wherein the second robot comprises:

a second robot body, the seating body being located on the second robot body;

a wheel connected to the second robot body;

a motor configured to rotate the wheel;

a battery located in the second robot body; and an inner proximity sensor located on the second robot body to sense the first robot.

19. A robot system comprising:

a station body;

a carrier located in the station body;

a first robot having a wheel and a lifter configured to lift the carrier relative to the station body, the first robot being configured to move in a first direction in the station body; and a second robot configured to move in the station body in a second direction different from the first direction, the second robot having a seating body on which the first robot is seatable, the seating body including a wheel accommodating portion configured to receive a portion of the wheel of the first robot.

20. A robot system comprising:

a station body;

a carrier located in the station body;

a first robot having a lifter configured to lift the carrier relative to the station body, the first robot being configured to move in a first direction in the station body; and a second robot configured to move in the station body in a second direction different from the first direction, the second robot including:

a second robot body;

a seating body on which the first robot is seatable, the seating body being located on the second robot body;

a wheel connected to the second robot body;

a motor configured to rotate the wheel;

a battery located in the second robot body; and an inner proximity sensor located on the second robot body to sense the first robot.

* * * * *